United States Patent
Lymberopoulos et al.

(10) Patent No.: US 9,441,453 B2
(45) Date of Patent: Sep. 13, 2016

(54) SAFETY VALVE CONTROL SYSTEM AND METHOD OF USE

(75) Inventors: David Lymberopoulos, Houston, TX (US); Benjamin R. Matthews, Missouri City, TX (US)

(73) Assignee: SAFOCO, INC., Houston, TX (US)

( * ) Notice: Subject to any disclaimer, the term of this patent is extended or adjusted under 35 U.S.C. 154(b) by 177 days.

(21) Appl. No.: 13/480,704

(22) Filed: May 25, 2012

(65) Prior Publication Data

US 2012/0227983 A1    Sep. 13, 2012

Related U.S. Application Data

(63) Continuation-in-part of application No. 13/195,662, filed on Aug. 1, 2011.

(60) Provisional application No. 61/551,319, filed on Oct. 25, 2011, provisional application No. 61/370,721, filed on Aug. 4, 2010, provisional application No. 61/415,238, filed on Nov. 18, 2010.

(51) Int. Cl.
*E21B 34/06* (2006.01)
*E21B 34/02* (2006.01)
(Continued)

(52) U.S. Cl.
CPC .............. *E21B 34/06* (2013.01); *E21B 34/02* (2013.01); *E21B 34/10* (2013.01); *E21B 34/16* (2013.01);
(Continued)

(58) Field of Classification Search
CPC .............. G05D 16/2086; F16K 17/00; F16K 37/0091; F16K 31/1262; E21B 34/02; E21B 34/06; E21B 34/10; E21B 34/16; Y10T 137/7761; Y10T 137/7762; Y10T 137/7769; Y10T 137/777; Y10T 137/0318; F15B 20/00; F15B 2211/31576; F15B 2211/6303; F15B 2211/665; F15B 2211/7052
USPC ...................... 137/488, 492, 492.5
See application file for complete search history.

(56) References Cited

U.S. PATENT DOCUMENTS 3,741,116 A    6/1973  Green et al.
3,776,249 A *  12/1973 Wailes et al. ................ 137/14
(Continued)

FOREIGN PATENT DOCUMENTS

EP    0 647 770 A2    4/1995
GB       2391880 A    2/2004
(Continued)

OTHER PUBLICATIONS

Versa Series B Valves Bulletin B-2011; Versa Products Company, Inc.; 2011, 8 Pages.
(Continued)

*Primary Examiner* — William McCalister

(57) ABSTRACT

A safety valve control system may include a remotely operable control assembly, a first transducer, a valve assembly, and a compressor assembly in communication with the control assembly. The control assembly is operable to actuate the pump and valve assemblies to supply fluid to actuate the safety valve into open and closed positions, in response to one or more signals received from the first transducer. A method of operation may include maintaining the safety valve in an open or closed position while sensing a physical property with the control system; communicating a signal corresponding to the sensed physical property to the control system; and automatically closing or opening the safety valve in response to a comparison of the sensed physical property to a pre-set condition.

18 Claims, 15 Drawing Sheets

(51) Int. Cl.
*E21B 34/10* (2006.01)
*E21B 34/16* (2006.01)
*F15B 20/00* (2006.01)
*F16K 37/00* (2006.01)
*F16K 31/126* (2006.01)

(52) U.S. Cl.
CPC .......... *F15B 20/00* (2013.01); *F16K 31/1262* (2013.01); *F16K 37/0091* (2013.01); *F15B 2211/31576* (2013.01); *F15B 2211/6303* (2013.01); *F15B 2211/665* (2013.01); *F15B 2211/7052* (2013.01); *Y10T 137/0318* (2015.04); *Y10T 137/777* (2015.04); *Y10T 137/7761* (2015.04); *Y10T 137/7762* (2015.04); *Y10T 137/7769* (2015.04)

(56) References Cited

U.S. PATENT DOCUMENTS

| | | | |
|---|---|---|---|
| 3,788,341 | A | 1/1974 | Athy, Jr. et al. |
| 3,922,111 | A | 11/1975 | Deters |
| 4,062,379 | A | 12/1977 | Clinton |
| 4,082,147 | A | 4/1978 | Wolff et al. |
| 4,213,480 | A | 7/1980 | Orum et al. |
| 4,215,746 | A | 8/1980 | Hallden et al. |
| 4,240,463 | A * | 12/1980 | Moore ........................ 137/492.5 |
| 4,461,449 | A | 7/1984 | Turner |
| 4,527,429 | A | 7/1985 | Combest et al. |
| 4,667,570 | A | 5/1987 | Jensen, Jr. et al. |
| 4,774,980 | A * | 10/1988 | Etheridge ...................... 137/488 |
| 5,097,857 | A | 3/1992 | Mayhew |
| 5,132,904 | A | 7/1992 | Lamp |
| 5,273,113 | A | 12/1993 | Schultz |
| 5,275,086 | A | 1/1994 | Stallings, Jr. |
| 5,335,730 | A * | 8/1994 | Cotham, III ................... 166/374 |
| 5,490,564 | A | 2/1996 | Schultz et al. |
| 5,526,883 | A | 6/1996 | Breaux |
| 5,684,451 | A | 11/1997 | Seberger et al. |
| 5,758,686 | A * | 6/1998 | Ohtsuka et al. ........... 137/492.5 |
| 6,116,268 | A * | 9/2000 | Johnson ........................ 137/458 |
| 6,199,629 | B1 | 3/2001 | Shirk et al. |
| 6,289,737 | B1 * | 9/2001 | Kouketsu et al. .............. 73/714 |
| 6,296,052 | B1 | 10/2001 | Sidwell |
| 6,349,772 | B2 | 2/2002 | Mullen et al. |
| 6,412,510 | B1 | 7/2002 | Johnson |
| 6,435,282 | B1 | 8/2002 | Robison et al. |
| 6,450,477 | B1 | 9/2002 | Young |
| 6,633,236 | B2 | 10/2003 | Vinegar et al. |
| 6,772,718 | B2 | 8/2004 | Allen |
| 6,854,704 | B1 | 2/2005 | Young |
| 7,004,445 | B2 | 2/2006 | Lymberopoulos |
| RE39,583 | E | 4/2007 | Upchurch |
| 7,231,971 | B2 | 6/2007 | McCalvin |
| 7,635,029 | B2 | 12/2009 | MacDougall et al. |
| 2002/0108747 | A1 | 8/2002 | Dietz et al. |
| 2002/0112632 | A1 | 8/2002 | Faibish |
| 2002/0124889 | A1 | 9/2002 | Sundararajan |
| 2003/0051881 | A1* | 3/2003 | Vinegar et al. ................ 166/374 |
| 2004/0135112 | A1 | 7/2004 | Greeb et al. |
| 2005/0087712 | A1 | 4/2005 | Lymberopoulos |
| 2005/0236594 | A1 | 10/2005 | Lilly et al. |
| 2006/0159569 | A1 | 7/2006 | Biester |
| 2006/0219299 | A1 | 10/2006 | Snowbarger |
| 2009/0126798 | A1 | 5/2009 | Mather |
| 2010/0025045 | A1 | 2/2010 | Lake et al. |
| 2010/0154894 | A1 | 6/2010 | Kotapish et al. |
| 2010/0236790 | A1 | 9/2010 | Smithson |
| 2011/0036415 | A1 | 2/2011 | Lymberopoulos |
| 2011/0094752 | A1 | 4/2011 | Hudson et al. |
| 2011/0240126 | A1 | 10/2011 | Lymberopoulos et al. |
| 2012/0031494 | A1 | 2/2012 | Lymberopoulos |
| 2013/0008519 | A1 | 1/2013 | Crawford |

FOREIGN PATENT DOCUMENTS

| | | |
|---|---|---|
| JP | 07-042856 A | 2/1995 |
| WO | 0165061 A1 | 9/2001 |
| WO | 02/25612 A1 | 3/2002 |
| WO | 2005097792 A1 | 10/2005 |

OTHER PUBLICATIONS

Rotowink Indicators; Norgren 1996; 2 Pages.
PCT Search Report and Written Opinion for International Application No. PCT/US2013/042095 dated Aug. 22, 2013.
PCT International Search Report and Written Opinion; International Application No. PCT/US2012/061313; Mailed Mar. 14, 2013.
Austrailian Exam Report for Patent Application No. 2011285979, dated May 16, 2014.
Canadian Office Action for Canadian Patent Applicaton No. 2,806,849, dated Aug. 29, 2014.
Chinese Office Action for Chinese Patent Applicaton No. 201180038303.7, dated Oct. 23, 2014.
Singapore Search Report and Written Opinion for Patent Application No. 2013007943, dated Oct. 17, 2014.
Australian Examination Report for Patent Application No. 2011285979, dated Feb. 13, 2015.

* cited by examiner

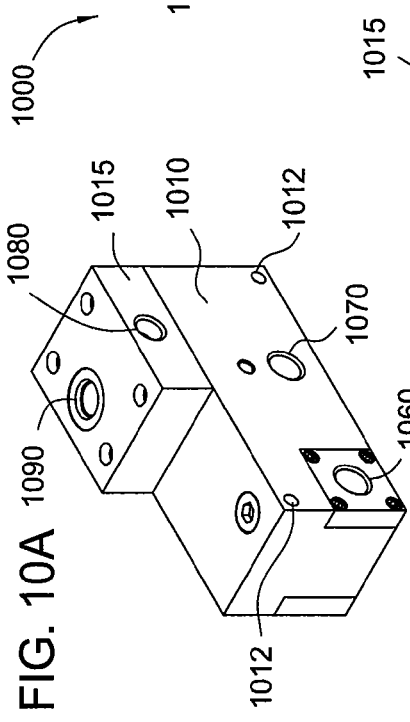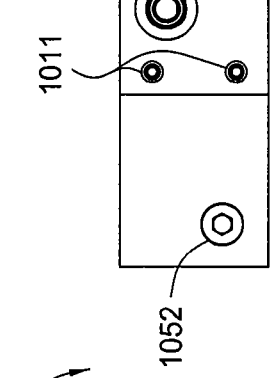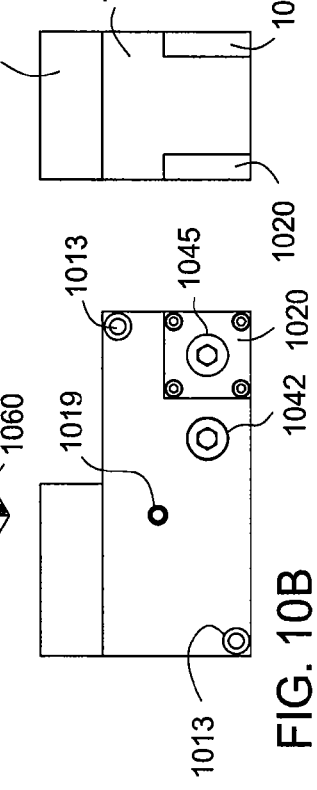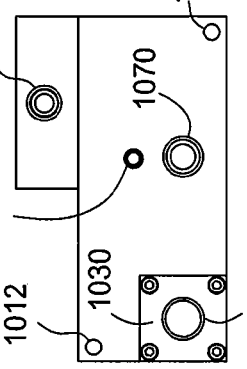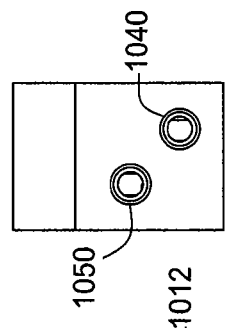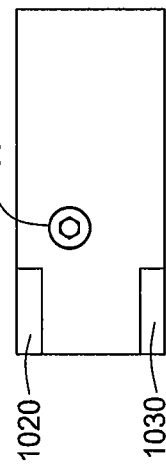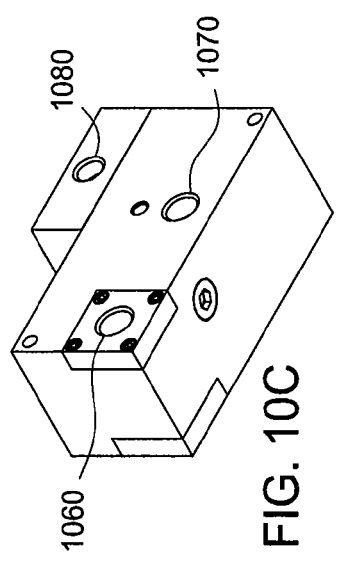

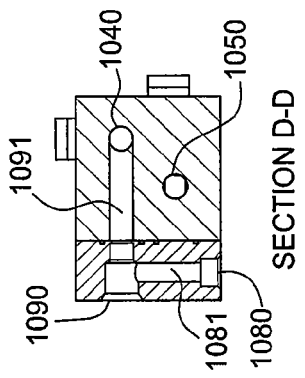
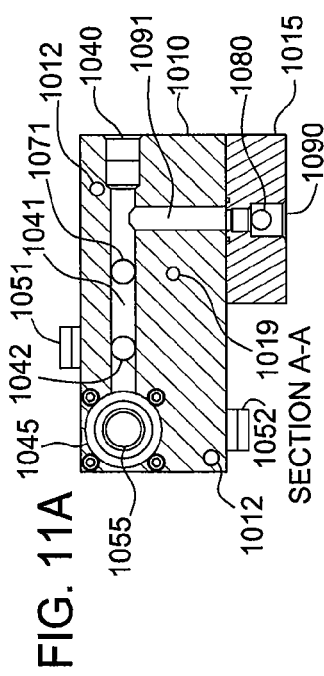
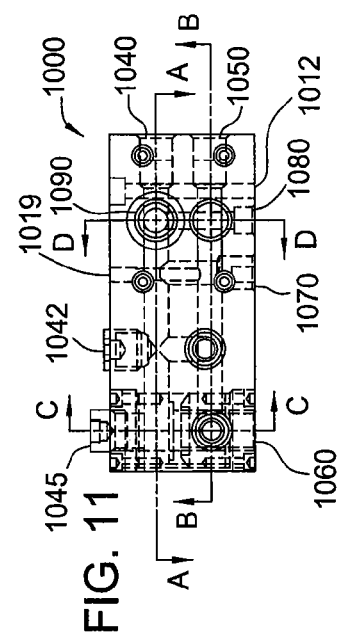
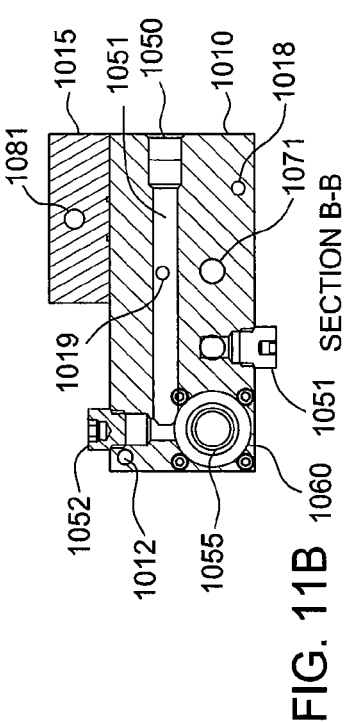
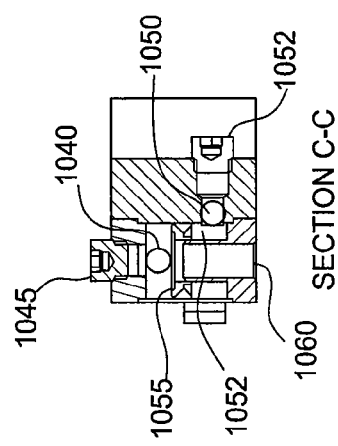

SAFETY VALVE CONTROL SYSTEM AND METHOD OF USE

CROSS REFERENCE TO RELATED APPLICATION

This application claims benefit of U.S. Provisional Patent Application Ser. No. 61/551,319, filed Oct. 25, 2011, and is a continuation-in-part of co-pending U.S. patent application Ser. No. 13/195,662, filed Aug. 1, 2011, which claims benefit of U.S. Provisional Patent Application Ser. No. 61/370,721, filed Aug. 4, 2010, and U.S. Provisional Patent Application Ser. No. 61/415,238, filed Nov. 18, 2010, the disclosures of which are herein incorporated by reference in their entirety.

BACKGROUND OF THE INVENTION

1. Field of the Invention

Embodiments of the invention relate to a wellhead control system for oil and gas wells. In particular, embodiments of the invention relate to systems and methods of an emergency shut down control system for surface and subsurface safety valves. Embodiments of the invention further relate to systems and methods of a relief valve control system.

2. Description of the Related Art

A wellhead system may be used to control the flow of fluids recovered from an oil and gas well in a safe and efficient manner. The wellhead system may include a variety of flow control devices, such as valves, which are operable direct fluid flow through a tubing system connected to the wellhead system. Fluids can be directed downstream of the wellhead system via the tubing system for further processing and/or storage.

The wellhead system may include surface and subsurface safety valves that are connected to the tubing system and are operable to shut off fluid flow through the tubing system in the event of an emergency in the well or at a location downstream of the wellhead system. Prior art safety valves are generally in fluid communication with the tubing system, and utilize the fluids therein for operation. For example, the pressure in the tubing system may be directly tied into the safety valves to actuate the valves into an open position, thereby allowing fluid flow through the system. In the event of an emergency, such as a rupture in the tubing system downstream of the safety valve or a drop in pressure in the well, as the pressure in the tubing system drops, so does the pressure in the safety valves. The safety valves are configured to move into a closed position after the pressure therein falls below a minimum pressure, thereby closing fluid flow through the tubing system and shutting in the wellhead system. Some safety valves may also be equipped with relief valves that are operable to block pressure from entering the valve and exhaust the pressure in the valve, thereby allowing the valve to move into a closed position.

There are numerous drawbacks to the prior art safety valve systems. One drawback includes the reliance of the safety valves on fluid pressure in the tubing system. These safety valves cannot be unilaterally operated as desired. Another drawback includes regular, manual maintenance of the safety valves to ensure that they are fully operational. Another drawback includes the potential pollution to the environment when fluid in the safety valves are exhausted into the atmosphere.

In some wellbore operations, such as when conducting a fracking operation, a high volume pressurized fluid is pumped to a manifold, which directs the fluid to one or more wells for fracturing the formation below. In the event that flow through the flow or fluid lines to the manifold and/or in the wells experience an interruption or become plugged, the highly pressurized fluid volume can cause catastrophic failure of the fluid lines, the wells, and any other equipment surrounding the wellsite, which can even potentially harm workers at the wellsite. Conventional relief valve systems are inefficient at detecting a failure, have slow response times, and/or are only one-time use, which require complete replacement in the event of operation.

Therefore, there is a need for a new and improved safety control valve system that is self reliant, can be remotely operated and monitored real-time, and can automatically shut in and/or relieve a wellhead system in the event of an emergency or when desired.

SUMMARY OF THE INVENTION

In one embodiment, a control system for controlling a safety valve attached to a flow line at a wellsite is provided. The control system includes a housing. The control system further includes a controller assembly disposed within the housing. The controller assembly is configured to receive a signal from a transducer connected to the flow line, wherein the signal corresponds to a measured physical property. Further, the control system includes a valve assembly disposed within the housing and in communication with the controller assembly. The control system further includes a compressor assembly disposed within the housing and in communication with the controller assembly. Additionally, the control system includes a power source disposed within the housing. The power source is configured to supply power to the controller assembly, the valve assembly, and the compressor assembly. The controller assembly is operable to cause the compressor assembly to supply pneumatic fluid to the safety valve to actuate the safety valve to an open position, wherein the controller assembly is operable to cause the valve assembly to actuate the safety valve to a closed position.

In one embodiment, a method for controlling a safety valve attached to a flow line at a wellsite is provided. The method includes the step of positioning a control system adjacent the safety valve. The control system has a controller assembly, a compressor assembly, and a power source disposed within a housing of the control system. The method further includes the step of supplying pneumatic fluid from the compressor assembly to the safety valve to open the safety valve. The method also includes the step of receiving a signal in the controller assembly corresponding to a sensed physical property in the flow line. Additionally, the method includes the step of closing the safety valve in response to a comparison of the sensed physical property to a pre-set condition.

In one embodiment, a control system for controlling a safety valve attached to a flow line at a wellsite may comprise a controller assembly configured to receive a signal from a transducer connected to the flow line, wherein the signal corresponds to a measured physical property; a valve assembly in communication with the controller assembly; and a fluid drive assembly in communication with the controller assembly, wherein the controller assembly is operable to actuate the fluid drive assembly to supply fluid to the safety valve to actuate the safety valve to a first position, and wherein the controller assembly is operable to actuate the valve assembly to actuate the safety valve to a second position.

In one embodiment, a method for controlling a safety valve attached to a flow line at a wellsite may comprise providing a control system for positioning adjacent to the safety valve, wherein the control system includes a housing, a controller assembly, a fluid drive assembly, and a valve assembly; supplying fluid to the safety valve using the fluid drive assembly to actuate the safety valve into a first position; monitoring a physical property in the flow line using the controller assembly; and actuating the valve assembly using the controller assembly to actuate the safety valve into a second position based upon a comparison of the monitored physical property to a predetermined condition.

In one embodiment, a method for controlling a safety valve attached to a flow line at a wellsite may comprise providing a remotely operable control system for positioning adjacent to the safety valve; actuating the safety valve into a closed position using the control system; monitoring fluid pressure in the flow line using a transducer in communication with the control system while maintaining the safety valve in the closed position; and actuating the safety valve into an open position using the control system when the monitored fluid pressure reaches or exceeds a predetermined fluid pressure to relieve fluid pressure in the flow line.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 10A-10H and 11-11D illustrate a valve assembly according to one embodiment.

DETAILED DESCRIPTION

Figure 1:
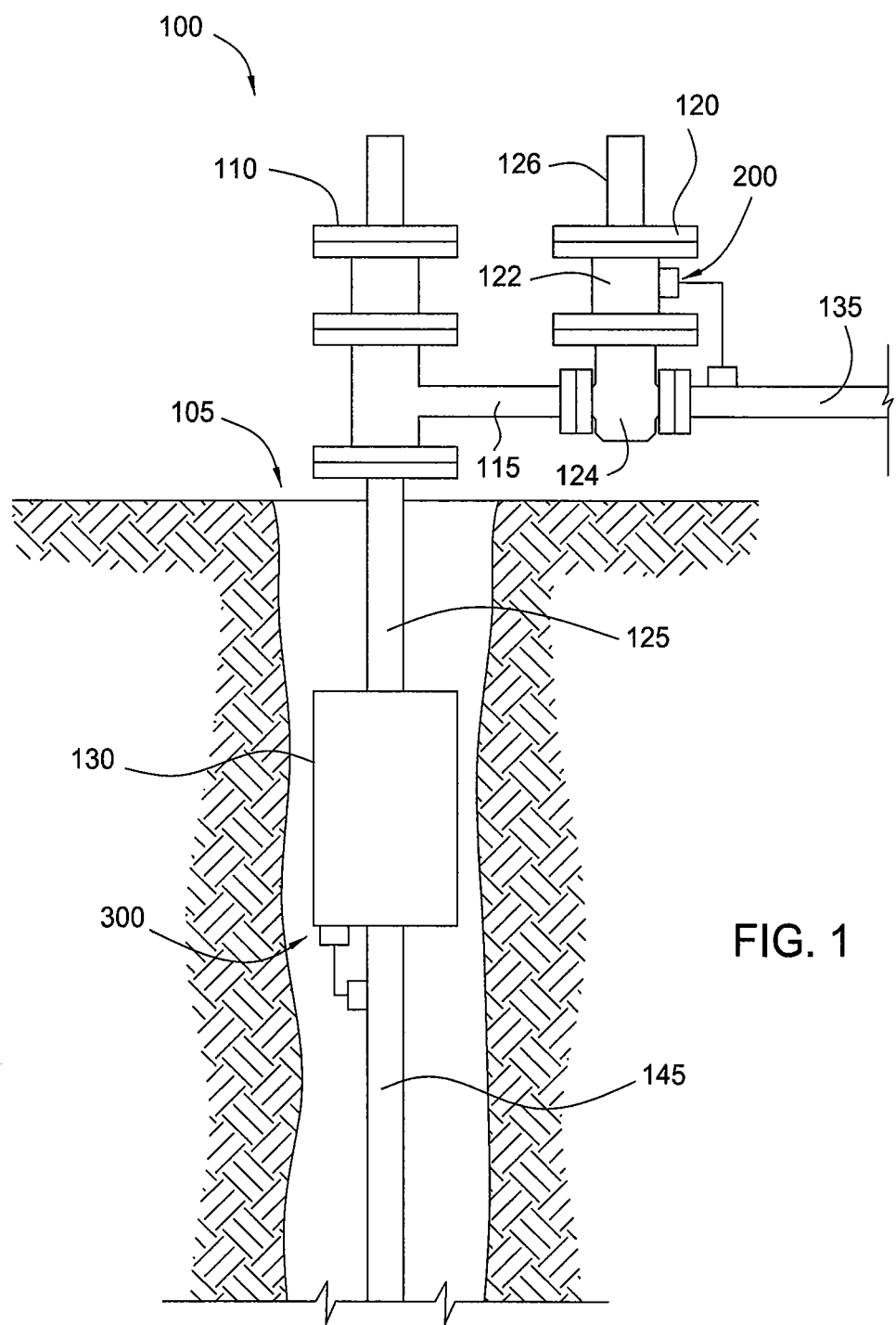
FIG. 1 illustrates a wellhead control system according to one embodiment.

FIG. 1 illustrates a wellhead control system 100 of an oil/gas well according to one embodiment. The wellhead control system 100 is configured to control the recovery of fluids, such as hydrocarbons, from a reservoir through a primary wellbore 105. The wellhead control system 100 includes a tree 110 having a series of valve and flow control devices, a surface safety valve 120 in communication with the tree 100 via tubing 115, and a subsurface safety valve 130 in communication with the tree 100 via tubing 125. The subsurface safety valve 130 may also be in communication with a well production flow line 145 used to recover oil and/or gas from the oil/gas well. The surface safety valve 120 may also be in communication with a surface production flow line 135 used to direct any recovered fluids to one or more locations downstream of the wellhead control system 100 for further processing and/or storage. In one embodiment, the safety valves 120, 130 may include pneumatically or hydraulically actuated valves. In one embodiment, the safety valves 120, 130 may include pneumatic valves that are operated using hydraulic fluid. Each of the safety valves 120, 130 may include a self contained emergency shut down ("ESD") control system, identified as items 200, 300, and 700, respectively, that (1) may be operable to automatically close the safety valves 120, 130; (2) may be operable to be continuously monitored and/or operated (opened and closed) in real-time from a remote location; and (3) may be operable to verify at all times the operating condition/characteristics of the safety valves 120, 130, and various other components of the control system.

The ESD control systems 200, 300 may be "self-contained," which means that they do not depend on any external pneumatic, hydraulic, mechanical, or electrical sources for their operation to shut down the oil/gas well. For example, if there is a rupture of a production flow line downstream from the surface safety valve 120, and/or if there is a loss of well pressure at the subsurface safety valve 130, the ESD control systems 200, 300 are operable to effectively close the safety valves 120, 130, thereby shutting in the oil/gas well, and alert the appropriate personnel that a shut-in has occurred without the assistance of any additional external pneumatic, hydraulic, mechanical, or electrical power sources. All of the operating fluids and mechanisms necessary to operate the safety valves 120, 130 are maintained within the ESD control systems 200, 300 so that there is no pollution of the environment, and so that any fluids and/or gases from the oil/gas well may be effectively contained therein without any additional external dependencies.

Figure 2:
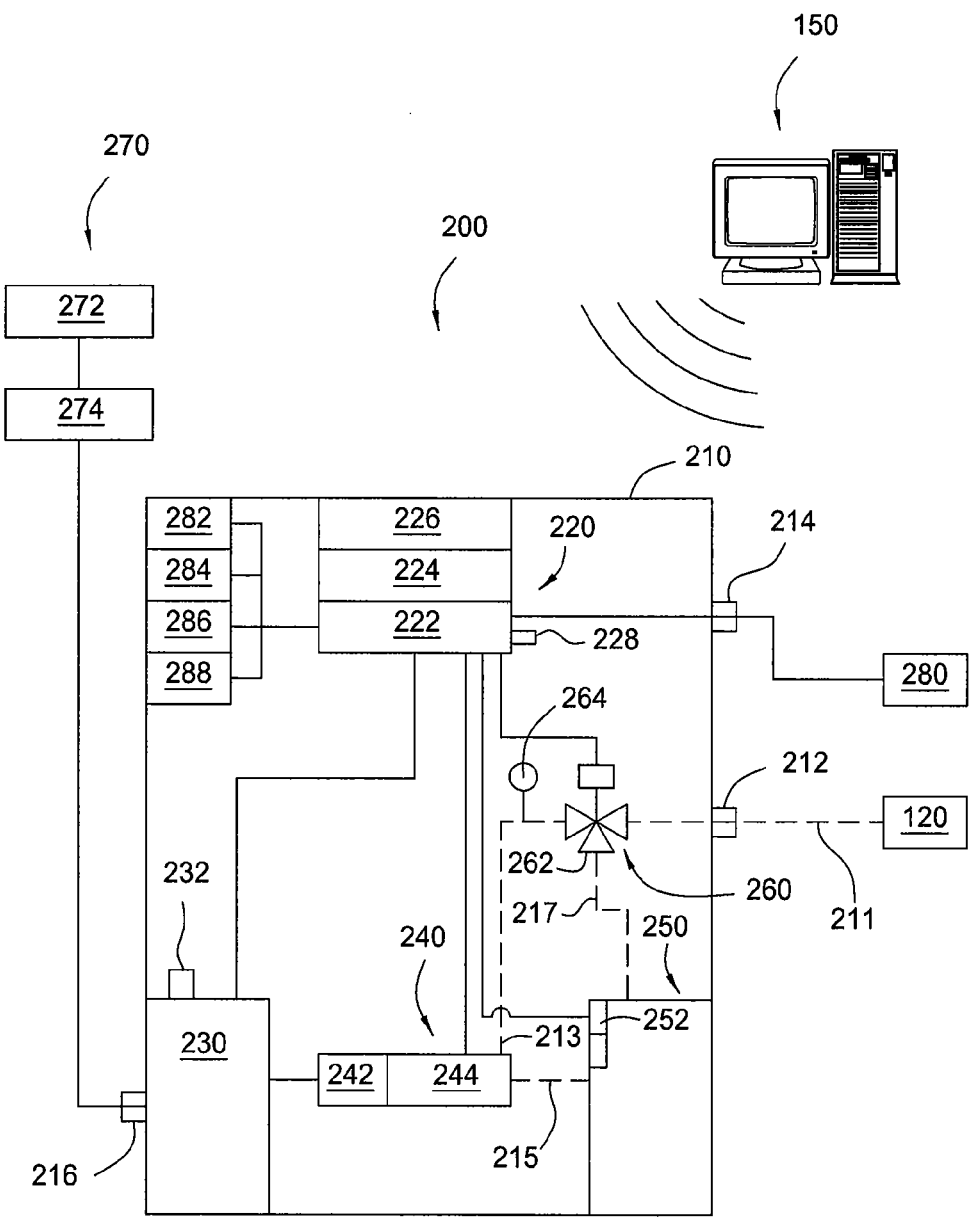
FIG. 2 illustrates a safety valve control system according to one embodiment.

FIG. 2 illustrates the ESD control system 200 according to one embodiment. Embodiments of the ESD control system 200 described herein are equally applicable to the ESD control system 300 (and vice versa). The ESD control system 200 may include a housing 210 for supporting a controller assembly 220, a power source 230, a pump assembly 240, a fluid reservoir 250, a valve assembly 260, and a solar panel assembly 270. The ESD control system 200 may also include one or more transducers/devices 280, 282, 284, 286, and 288 for monitoring and/or measuring one or more physical properties (further described below). In one embodiment, the ESD control system 200 may be configured to control one or more valves, such as flow control valves or choke valves, that are in communication with the flow lines of the valves 120, 130 to control fluid flow through the wellhead control system 100.

The housing 210 may include any structural support member, such as an explosion-proof container, for protecting the components stored therein from damage and environmental elements. Appropriate ventilation of the housing 210 may be provided by ventilation holes and/or an independent solar powered fan mounted in or through the housing 210. The housing 210 may further include an access panel or door for ease of access to the housing's interior, and may be configured for attachment to the tree 110 or the respective surface and subsurface safety valve 120, 130. One or more manifold assembles 212, 214, 216 may be provided on the housing 210 for fluid and/or electrical connections between the housing 210 (and the components within the housing 210) and the safety valves 120, 130, the solar panel assembly 270, and the transducer 280. In one embodiment, the manifold assembly 216 includes a solar converting charger device. In one embodiment, the structural components of the ESD control systems 200, 300, to the extent possible, may be made from stainless steel.

The controller assembly 220 may be disposed in the housing 210 and may include a microprocessor unit 222, a display screen 224, and a keypad 226. In one embodiment, the controller assembly 220 may be weather-proof, and may be intrinsically safe to provide power as necessary to one or more components of the ESD control systems 200, 300. In one embodiment, the controller assembly 220 may be positioned external to and/or adjacent to the housing 210. The microprocessor unit 222 may include a programmable logic controller, including a supervisory control and data acquisition system (SCADA) that is in communication with the one or more transducers/devices 280, 282, 284, 286, and 288, as well as the pump and valve assemblies 240, 260. The microprocessor unit 222 may include a current regulator to provide low current transmission between the controller assembly 220 and the various components of the control system. A watchdog sensor 228 may be used to monitor the operation of the microprocessor unit 222 and provide an alarm in the event of a failure. The controller assembly 220 may be operable to send and receive signals with a computer system 150 (such as a desktop computer, laptop computer, or personal digital assistant (PDA)) at a remote location from the wellhead control system 100. In one embodiment, the signals may be sent and/or received between the controller assembly 220 and the computer system 150 via wired and/or wireless telemetry means, including but not limited to electrical wires, fiber optical cables, radio frequency, infrared, microwave, satellite, and/or laser light communication. In this manner, the ESD control systems 200, 300, 700 can be monitored and operated remotely from one or more locations on-site or off-site relative to the wellhead control system 100. In one embodiment, the ESD control systems 200, 300, 700 may be configured for manual and/or remote operation on-site at the wellhead control system 100. In one embodiment, the controller assembly 220 may be programmed with one or more trigger points, such as upstream and/or downstream high and/or lower pressure points, that will automatically trigger operation of the ESD control system 200, 700 upon sensing a pressure outside of the trigger point ranges. In one embodiment, the controller assembly 220 may be configured with a "master/slave" polling protocol or a "master/master" polling protocol as known in the art to retrieve and communicate information regarding the ESD control system 200, 700 as desired.

In one embodiment, the controller assembly 220 may be in communication with a pressure transducer 280 that is connected to the surface production flow line 135 as illustrated in FIG. 1. The pressure transducer 280 can measure the pressure in the flow line 135 and communicate a signal corresponding to the measured pressure to the controller assembly 220. The pressure transducer 280 can be connected at various other locations within the wellhead control system 100, such as at the tree 110 or the tubing 115, 125. In one embodiment, the transducer 280 can be used to measure fluid flow rate or detect hydrogen sulfide. In one embodiment, one or more transducers 280 may be used to measure and/or detect additional well characteristics at the wellhead control system 100 and communicate the measured/detected well characteristics to the controller assembly 220 via a signal corresponding to the measurement or detection for comparison to one or more predetermined conditions.

Regarding the pressure transducer 280, the signal may be recorded and/or communicated to the computer system 150 via the controller assembly 220 to provide real-time monitoring of the pressure in the flow line 135. The measured pressure may be displayed on the display screen 224 and/or on a display screen of the computer system 150. In response to the measured pressure, the controller assembly 220 may be configured to operate the respective safety valve 120, 130 to which it is connected. For example, the controller assembly 220 may be used to direct the pump assembly 240 and the valve assembly 260 to supply fluid from the fluid reservoir 250 to the surface safety valve 120 to open the valve. Upon receiving the signal from the controller assembly 220, the valve assembly 260 may be configured to open a circuit defined by lines 211, 213, 215 between the surface safety valve 120 and the fluid reservoir 250 to allow the pump assembly 240 to direct pressurized fluid from the fluid reservoir 250 to the surface safety valve 120, thereby opening the surface safety valve 120. The surface safety valve 120 may be maintained in the open position while the pressure transducer 280 continuously monitors the pressure in the flow line 135. The controller assembly 220 may be programmed to close the surface safety valve 120 upon receiving a signal from the pressure transducer 280 that corresponds to a pressure measurement that is greater than or less than a predetermined condition, such as a pre-set pressure range. The pre-set pressure range may be input into the controller assembly 220 by manual entry using the keypad 226 and the display screen 224. The pre-set pressure range may also be input into the controller assembly 220 remotely from the computer system 150. When the signal is received from the pressure transducer 280 that the pressure in the flow line 135 falls outside of the pre-set pressure range stored in the microprocessor unit 222, the controller assembly 220 may automatically direct the valve assembly 260 and/or the pump assembly 240 to return the fluid from the surface safety valve 120 to the fluid reservoir 250. Upon receiving the signal from the controller assembly 220, the valve assembly 260 may be configured to open a circuit defined by lines 211, 217 between the surface safety valve 120 and the fluid reservoir 250 to allow the pressurized fluid to dump into the fluid reservoir 250, thereby closing the surface safety valve 120. In one embodiment, a closing pressure generated by the surface safety valve 120 may be used to force the fluid into the fluid reservoir 250. Continuous real-time monitoring of the pressure in the flow line 135 may be used to verify that the surface safety valve 120 has been closed.

The ESD control systems 200, 300, 700 may be adjusted at anytime and can be configured to shut in the wellhead control system 100 at anytime manually and/or remotely. In particular, the microprocessor unit 222 can be programmed with one or more pre-set conditions, manually using the display screen 224 and keypad 226 and/or remotely via the computer system 150. The pre-set conditions may be changed at anytime. And when a signal is received from one or more of the various transducers/devices and/or the computer system 150 that conflicts with the pre-set conditions when compared, the controller assembly 220 may be operable to automatically close the safety valve 120, 130 to which it is connected. The controller assembly 220 may be operable when the signal is above the pre-set condition or when the signal is below the pre-set condition. Continuous real-time monitoring of the ESD control systems 200, 300, 700 may be used to verify the operating condition/characteristics of the wellhead control system 100 components at all times.

In one embodiment, the ESD control systems 200, 300, 700 may communicate an auditory, visual, or other similar type of sensory signal that the wellhead control system 100 has been shut in. In one embodiment, the controller assembly 220 may send a signal to the computer system 150 that can be converted into an alarm to alert an operator of the shut-in. In one embodiment, the controller assembly 220 may send a signal to trigger an indication device 282, such as an auditory and/or visual alarm disposed interior or exterior of the housing 120, to alert an operator within close proximity of the wellhead control system 100 of the shut-in.

In one embodiment, the ESD control systems 200, 300, 700 may include an emergency shutdown device 284 manually and/or remotely operable to automatically give an alarm and send a signal to the controller assembly 220 to shut in the wellhead control system 100. In one embodiment, the ESD control systems 200, 300, 700 may include a fire device 286 that senses heat, and automatically gives an alarm and shuts in the wellhead control system 100 via the controller assembly 220 when the measured heat exceeds a certain temperature. In one embodiment, the ESD control systems 200, 300, 700 may include an anti-intrusion device 288 that when activated automatically gives an alarm and shuts in the wellhead control system 100 via the controller assembly 220, for example when a theft is attempted or the control system sustains some type of structural damage. In one embodiment, one or more of the transducers 282, 284, 286, 288 may be used to detect hydrogen sulfide (H2S), other gases and vapors, and/or the level of fluid in one or more storage tanks that are in fluid communication with the valves 120, 130. Each of the devices 284, 286, 288 may be continuously monitored real-time using the controller assembly 220 via the computer system 150 to verify operating conditions/characteristics of the wellhead control system 100.

Power may be provided to the controller assembly 220 and the pump assembly 240 from the power source 230. The power source 230 may be operable to provide a low current (amp) stream to the controller assembly 220 and/or the pump assembly 240. In one embodiment, the power source 230 may include an intrinsically-safe battery, such as a 12 or 24 volt, direct current, explosion-proof power supply. In one embodiment, the power source 230 may include a watchdog sensor 232 to communicate to the computer system 150 via the controller assembly 220 a failure of the power source. The watchdog sensor 232 may also give an auditory or visual alarm to alert an operator onsite that the power source 230 is low and/or dead. The controller assembly 220 may be configured to automatically shut in the wellhead control system 100 upon receiving a signal from the sensor 232. In one embodiment, the power source 230 may be a (re-chargeable) power supply that is supported by the solar panel assembly 270. The solar panel assembly 270 may include one or more solar panels 272 connected to the exterior of the housing 210 to consume light energy from the sun to generate electricity. The solar panels 272 may be connected to the exterior of a housing 730 in the ESD control system 700. An intrinsically safe voltage controller 274 may deliver electrical current at an appropriate voltage, 12 or 24 volts for example, to the power source 230, which in turn supplies power to the controller assembly 220 and/or pump assembly 240. In one embodiment, the solar panel assembly 270 may be configured to provide enough power to the ESD control systems 200, 300, 700 to open and close the safety valves 120, 130 ten or more times from about two hours of sunlight per day.

In one embodiment, the pump (or fluid drive) assembly 240 may include an intrinsically safe motor 242 and a pump 244, which may each be located in the explosion-proof housing 210. The pump 244 may include a rotary piston pump with about a 100 to 10,000 psi range. The pump assembly 240 may pump pneumatic and/or hydraulic fluid from the fluid reservoir 250 to actuate the safety valve 120, 130 to which it is connected.

In one embodiment, the fluid reservoir 250 may be configured to store an amount of operating fluid sufficient to actuate the safety valve 120, 130 to which it is connected. The operating fluid may include air, water, propylene glycol, and other valve operating fluids known in the art. In one embodiment, the fluid reservoir 250 may include a level gauge 252, such as a sight glass, to indicate the level of fluid in the fluid reservoir 250. The fluid reservoir may also include a level sensor 252 that is in communication with the controller assembly 220 and is operable to monitor in real-time the level of fluid in the fluid reservoir 250. In the event that the level of fluid falls below a pre-set limit, due to evaporation of the fluid for example, the level sensor 252 may provide an alarm to alert an operator on-site at the wellhead control system 100 and/or at the remote location via the controller assembly 220 and the computer system 150. The controller assembly 220 may automatically shut in the wellhead control system 100 upon receiving a signal from the level sensor 252.

In one embodiment, the valve assembly 260 may include one or more (intrinsically safe) valves 262 to control and direct communication between the pump assembly 240, the fluid reservoir 250, and the safety valve 120, 130 to which it is connected. The one or more valves 262 may include solenoid valves, shuttle valves, and/or any other type of valves operable to open and close the fluid circuits between the pump assembly 240, the fluid reservoir 250, and the safety valve 120, 130 to which it is connected. The valve assembly 260 may include an internal relief valve and/or circuit to rapidly expel the fluid from the safety valves 120, 130 to the fluid reservoir 250 to ensure quick closure of the safety valves 120, 130. The valve assembly 260 may include one or more gauges, such as pressure gauge 264, which can be visually inspected to monitor the pressure in the valve assembly 260 flow lines. In one embodiment, the pressure gauge 264 may be configured to shut off the pump assembly 240 when the pressure in the actuator of the safety valves 120, 130 reaches a pre-determined pressure setting. The one or more valves 262 may be controlled by the controller assembly 220 as described above.

In one embodiment, the display screen 224 and/or one or more gauges may be mounted through a front panel of the housing 210, 730 to indicate pressure within the various valves and lines in fluid communication with the ESD control systems 200, 300, 700 and the wellhead control system 100.

Figure 3:
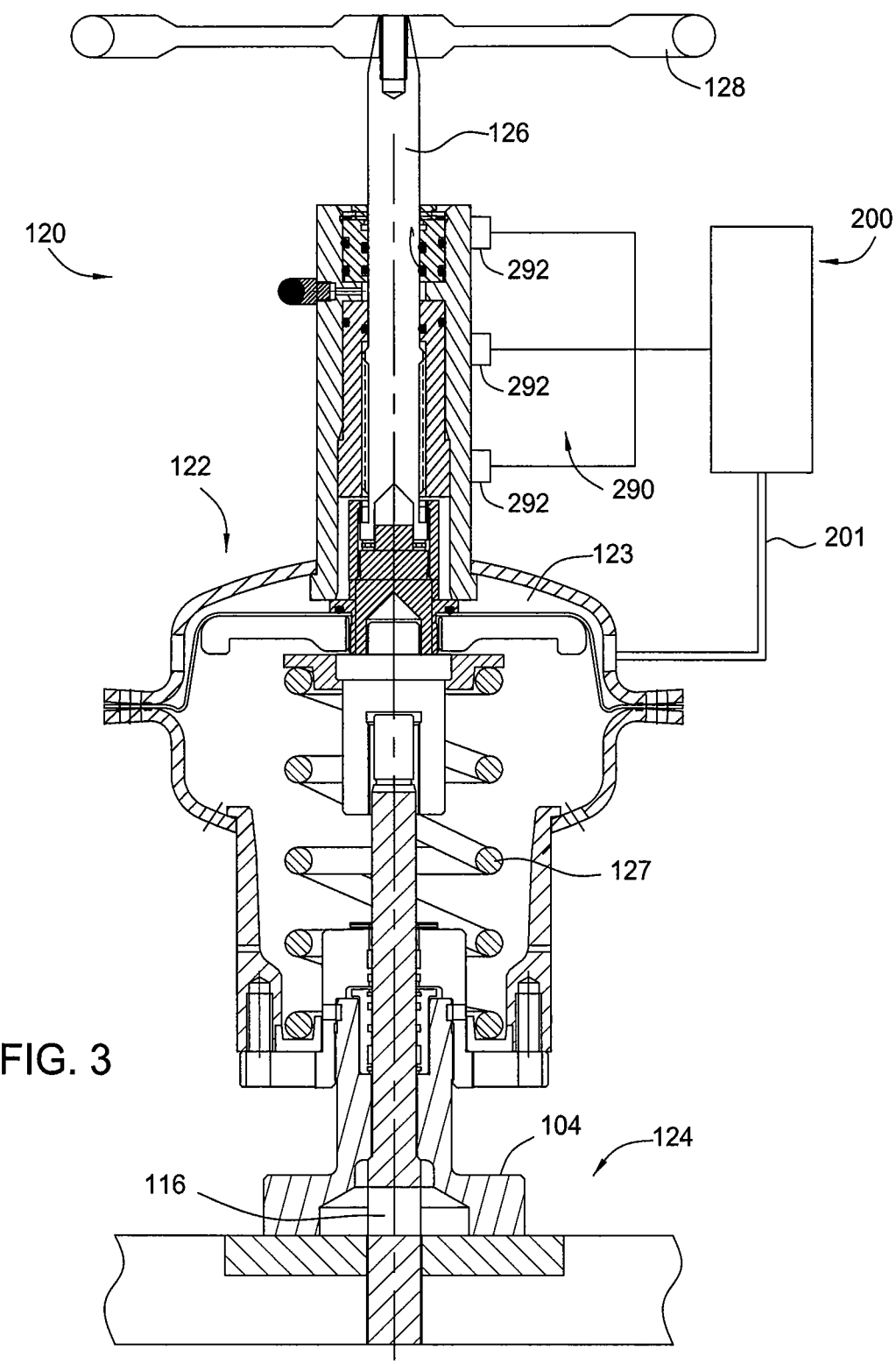
FIG. 3 illustrates a surface safety valve according to one embodiment.

FIG. 3 illustrates a surface safety valve 120 according to one embodiment. The surface safety valve 120 may include a valve actuator 122 for moving a gate 116 within a body 104 of a gate valve 124 between an open and closed position. Pressurized fluid from the fluid reservoir 250 of the ESD control system 200 or pressurized fluid from the ESD control system 700 may be supplied to a chamber 123 of the valve actuator 122 via tubing 201 to open the gate valve 124. A biasing member 127, such as a spring disposed within the valve actuator 122 may be used to close the gate valve 124 when the force of the biasing member exceeds the fluid pressure in the valve actuator chamber 123. The valve actuator 122 may also include a top shaft 126 that can be used to manually actuate the valve actuator 122 by rotation of a hand wheel 128 to open and close the gate valve 124. The top shaft 126 may also be used as a visual indication to determine whether the gate valve 124 is in an open or closed position. For example, when the top shaft 126 is fully extended outward from the upper end of the valve actuator 122, the gate valve 124 may be in a closed position, and when the top shaft 126 is retracted into the upper end of the valve actuator 122, the gate valve 124 may be in an open position.

In one embodiment, the ESD control systems 200, 300, 700 may include a position indication assembly 290 that is operable to indicate whether the surface safety valve 120 is in an open or closed position, including any partial open/closed position therebetween, based on the location of the top shaft 126. As illustrated in FIG. 3, when the top shaft 126 is in a fully extended position, the surface safety valve 120 is in the closed position. As the surface safety valve 120 begins to open and is moved either manually or automatically to the open position, the top shaft 126 will retract into the upper end of the valve actuator 122. The position indication assembly 290 may include one or more sensors 292 operable to sense the extension and retraction of the top shaft 126. The sensors 292 may communicate a signal to the controller assembly 220 corresponding to the measured position, which may then send a signal to the computer system 150 and display the measured position on a display screen. In this manner, an operator can continuously monitor and verify the position of the surface safety valve 120 at all times. The position indication assembly 290 can also be used to verify that the surface safety valve 120 is closed in the event that one of the other ESD control system 200, 700 components initiated a shut-in of the wellhead control system 100. In one embodiment, the sensors 292 may include magnetic sensors operable to sense a magnetic material of the top shaft 126. For example, one or more sensors 292 may be positioned at various locations along the longitudinal stroke of the top shaft 160 during opening and closing of the gate valve 124. When the top shaft 160 is fully extended, all of the sensors 292 may sense the magnetic material of the shaft, thereby indicating that the gate valve 124 is closed. However, when the top shaft 160 is fully retracted, only the sensors 292 closest to the upper end of the valve actuator 122 may sense the magnetic material of the shaft, thereby indicating that the gate valve 124 is open. In one embodiment, the sensors 292 may include other types of position sensors known in the art to monitor and measure the position of the top shaft 126.

In one embodiment, the ESD control system 200, 300, 700 can be used to partially stroke the safety valves 120, 130. In one embodiment, the controller assembly 220 may be configured to direct the pump assembly 240 and valve assembly 260 to supply an amount of operating fluid to the safety valves 120, 130 to partially open the safety valves. In one embodiment, the controller assembly 220 may be configured to direct the pump assembly 240 and valve assembly 260 to return an amount of operating fluid from the safety valves 120, 130 to partially close the safety valves. The controller assembly 220 may be programmed to automatically conduct a partial stroke of the safety valves 120, 130 after a pre-set amount of time or other condition. The controller assembly 220 may be manually and/or remotely operable to conduct a partial stroking of the safety valve to which it is connected when desired. The sensors 292 of the position indication assembly 290 can be used to monitor and verify the partial stroke of the safety valves 120, 130, based on the position of the top shaft 126. The partial stroking of the safety valves 120, 130 can assist in preventing/removing build-up of debris within the valves from the fluids flowing therethrough, which can potentially prevent complete opening and/or closing of the valves when necessary.

In one embodiment, the ESD control systems 200, 300, 700 may be configured to perform a specific sequential opening and closing of the safety valves 120, 130 when starting up or shutting in the wellhead control system 100. In one embodiment, either ESD control system 200, 300, 700 may initiate closure or opening of the surface safety valve first 120, and then closure or opening of the subsurface safety valve 130. In one embodiment, either ESD control system 200, 300, 700 may initiate closure or opening of the subsurface safety valve first 130, and then closure or opening of the surface safety valve 120. In one embodiment, if one of the ESD control system 200, 700 components initiates a shut-in, the controller assembly 220 may automatically send a signal to the computer system 150, which may then automatically send a signal to the controller assembly of the ESD system 300 to initiate closing of the subsurface safety valve 130. After closure of the subsurface safety valve 130 is verified by the ESD control system 300 via the computer system 150, another signal may be sent to the ESD control system 200, 700 to then initiate closing of the surface safety valve 120. The reverse process may be performed beginning with the ESD control system 300 if closure of the surface safety valve 120 is required prior to closure of the subsurface safety valve 130.

In one embodiment, a method for controlling a wellhead control system having a plurality of valves, including a surface safety valve and a subsurface safety valve, may include producing power with solar panel assembly and delivering the produced power to a controller assembly and to a pump assembly that supplies operating fluid to the valves, the control assembly operable to monitor a variety of conditions in an oil/gas well and at the wellhead control system. The controller assembly may be used to control the operation of the pump assembly and the valves manually, remotely, automatically, and/or in response to one or more pre-set conditions programmed in the controller assembly. The solar panel assembly may provide to a power source or directly to a pump assembly to operate a motor of the pump assembly, which in turn operates a pump of the pump assembly. The motor may be controlled by the controller assembly. The controller assembly may include a microprocessor and its related apparatuses, circuits, devices, switches, etc. The power produced by the solar panel assembly may be stored in a power source, such as in one or more battery apparatuses for use on demand. The use and flow of the stored power may be controlled and/or monitored by the controller assembly. The pump assembly may supply operating fluid (hydraulic and/or pneumatic) at a low or high pressure to operate either of both of the safety valves as directed by the controller assembly. The pre-set condition may include a fluid flow parameter, a flow line condition, an alarm, an emergency condition, and/or an intrusion of the components of the wellhead control system, including the valves and the controller assembly.

The voltages of power from the solar panel assembly may be controlled with a voltage controller having a sensor provide an alert signal, an alarm signal, and/or a shut-off signal if a pre-set voltage is exceeded or is not provided. One or more sensors may be provided to sense an amount and/or pressure of available operating fluid in any or all of the flow lines used and/or in a fluid reservoir, the sensor(s) providing a signal to indicate fluid volume and/or fluid pressure to the controller assembly. In response to the signal, the controller assembly may operate one or more of the valves and/or shut in the wellhead control system. The controller assembly may signal other devices, such as the pump assembly or a valve assembly to increase fluid pressure and/or fluid amount in some or all of the flow lines. A sensor may signal the controller assembly when a fire is detected and provide a fire alarm. The controller assembly may provide a fire alarm signal to a remote location and/or operate the valves to shut in the wellhead control system. The signals of alarm, intrusion, etc. may be provided at the immediate area of the wellhead control system and to a remote location via known transmission methods.

The controller assembly may be operable to monitor the various components of the wellhead control system and employing intrinsically safe components. A single controller assembly may be operable to control a surface safety valve, a subsurface safety valve, as well as one or more additional valves in communication with the wellhead control system. The controller assembly may be operable to control the subsurface safety valve with an electric submersible pump. The controller assembly may be operable to remotely shut in the wellhead control system using switches interconnected therewith, telephone, radio, SCADA, DCS and/or satellite signals. One or more sensors may be use to detect dangerous gases in the oil/gas well and/or at the wellhead control system and producing an alarm signal in response. A thermoelectric generator may be used instead of or in addition to a solar panel assembly. The pre-set condition(s) may include one or more of the following: the presence of fire or dangerous gases, intrusion by unwanted humans or animals, vandalism, damage, or destruction of equipment used in the wellhead control system, or too low to too high fluid pressures, fluid volumes, power amperages, or power voltages. In one embodiment, that various components of the control system may be weather proof and "intrinsically safe," i.e. that they require vastly reduced power levels and therefore minimize the risk of sparks and explosions, e.g. less than 100 milliamps.

Figure 4:
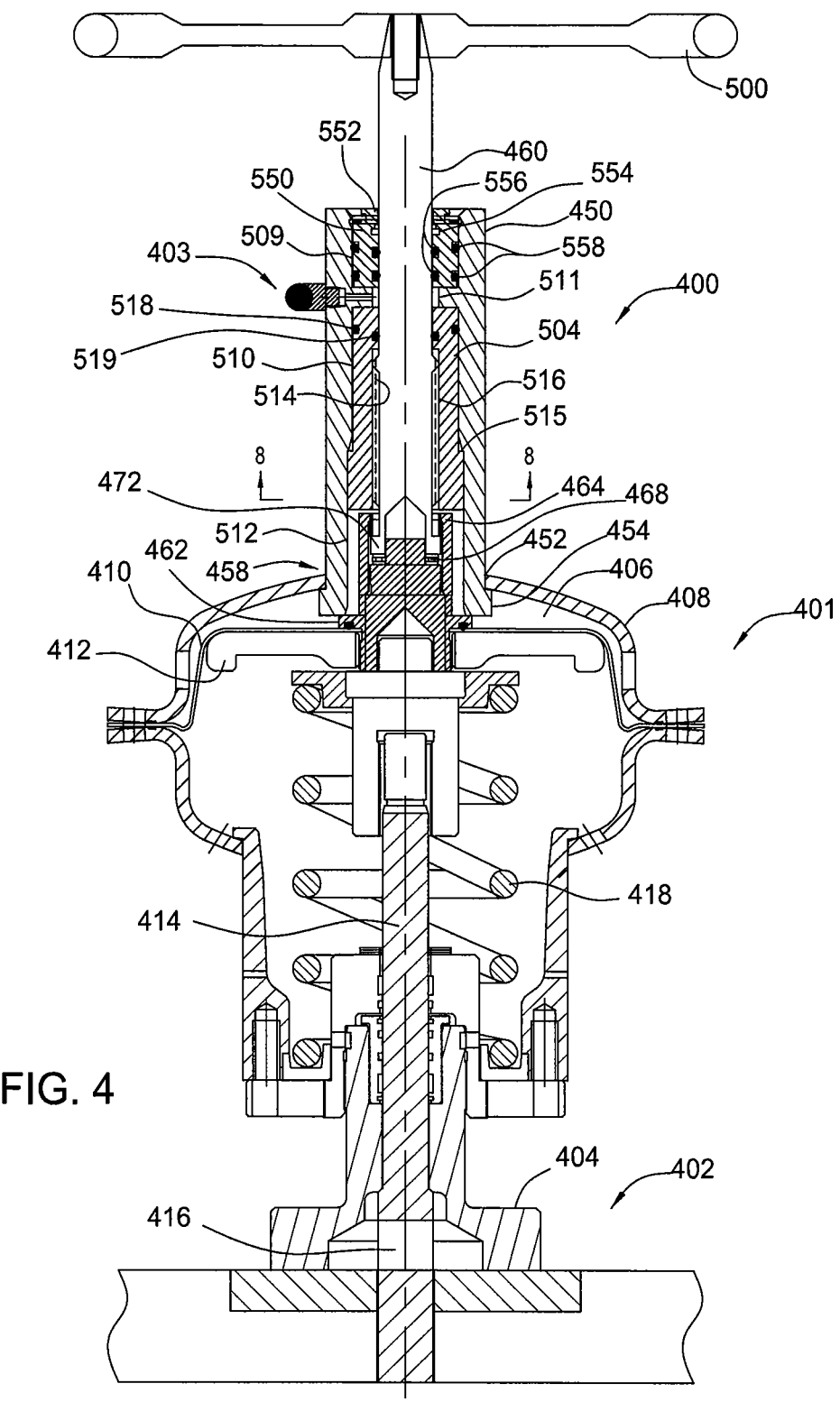
FIG. 4 is a sectional view of a gate valve, an actuator, a mechanical override, and a safe mode indicator.
Figure 6:
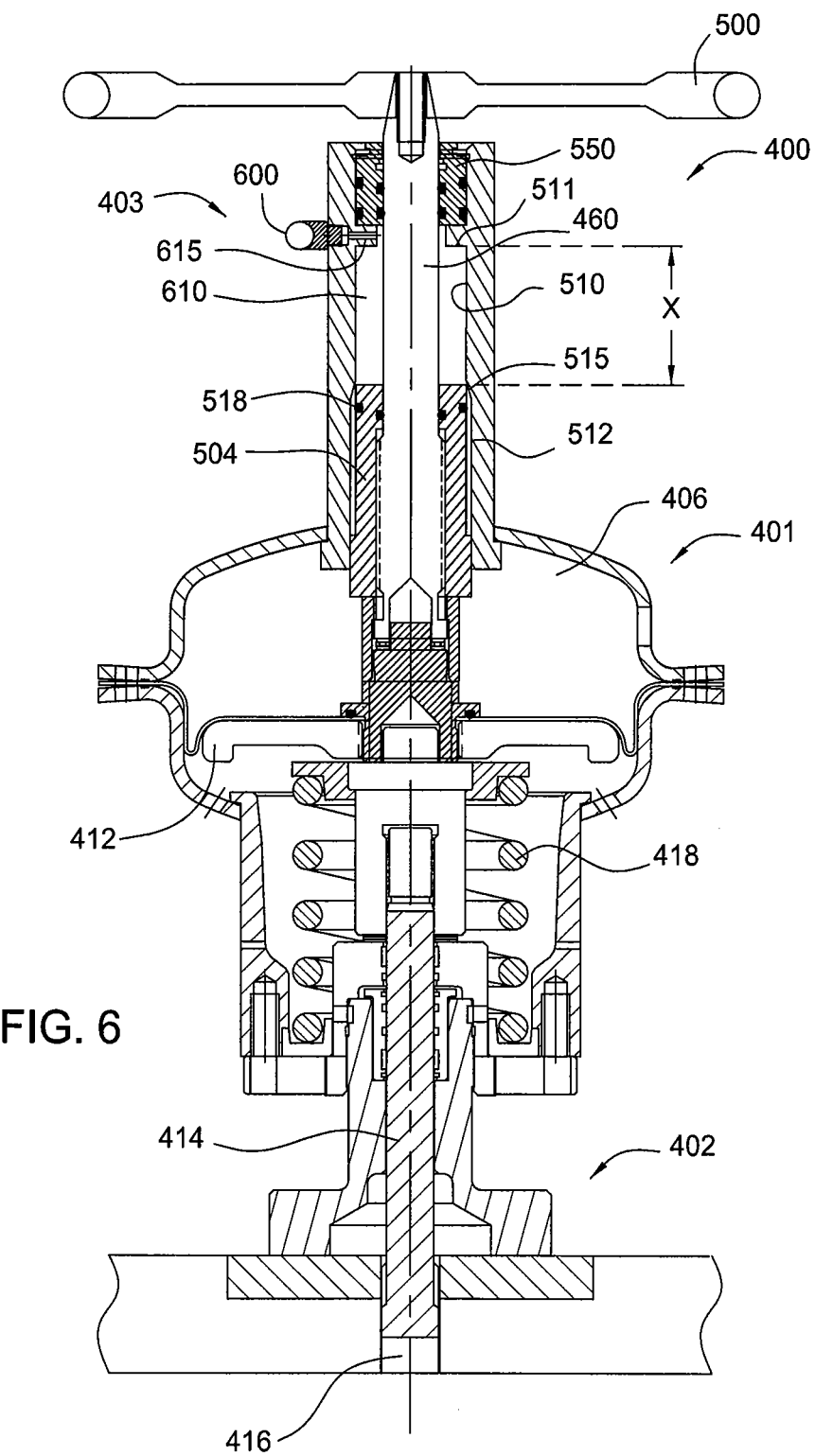
FIG. 6 is a sectional view of the gate valve in the open position after an automatic operation of the actuator and with the safe mode indicator indicating that the gate valve is operating in a safe mode.

FIG. 4 is a sectional view of a mechanical override 400, an actuator 401, a gate valve 402, and a safe mode indicator 403. The actuator 401 couples to a valve body 404 of the gate valve 402. A bonnet assembly can provide an interface between the gate valve 402 and the actuator 401. During an automatic operation of the gate valve 402, hydraulic or pneumatic pressure enters a chamber 406 of the actuator 401 defined by a cover 408 of the actuator 401 and a diaphragm 410 positioned over an operator member 412. The operator member 412 moves in response to the hydraulic or pneumatic pressure within the chamber 406 and against a biasing force supplied by a spring 418. A valve stem 414 coupled to a sliding gate 416 of the gate valve 402 moves in response to the movement of the operator member 412. In this manner, the automatic operation of the actuator 401 moves the sliding gate 416 of the gate valve 402 between a closed position shown in FIG. 4 and an open position as shown in FIG. 6.

In one embodiment, the actuator 401 may be selected from the pneumatic and hydraulic actuators described in detail in U.S. Pat. No. 6,450,477 which is herein incorporated by reference in its entirety. The actuator 401 may be selected from any other actuator known in the industry for moving the sliding gate 416 of the gate valve 402 between the open and closed positions by automatic operation.

When using the automatic operation of the actuator 401, the biasing force of the spring 418 is configured to act as a fail-safe mechanism. When the pressure in the actuator 401 is removed, inadvertently or otherwise, the spring 418 will move the gate valve 402 into a fail-safe closed position illustrated in FIG. 4 or a fail-safe opened position illustrated in FIG. 12. Although the mechanical override 400 may provide an additional means to actuate the gate valve 402 in the event of a failure, such as a loss of pressure, it may also override the fail-safe mechanism. The mechanical override 400 may prevent the spring 418 from moving the gate valve 402 into the fail-safe closed position or the fail-safe opened position. The gate valve 402 is operating in a safe mode when the fail-safe mechanism has not been overridden by the mechanical override and is not prevented or inhibited from moving into the fail-safe closed position or the fail-safe opened position. Therefore, the safe mode indicator 403 is configured to provide a signal, such as a visual indication, communicating to a valve operator that the valve is or is not operating in the safe mode. The signal from the safe mode indicator 403 may also communicate that (1) the valve will move to the fail-safe closed position or the fail-safe opened position in the event of a pressure loss in the actuator, (2) the valve has been automatically actuated into the open position, and/or (3) the mechanical override will not disable or interfere with the fail-safe mechanism.

As illustrated in FIG. 4, the mechanical override 400 is connected to the actuator 401 to provide a manual operation for moving the sliding gate 416 between open and closed positions. The mechanical override 400 includes a top shaft 460, a lever for manual rotation of the top shaft 460, such as a handwheel 500, a housing 450 having a longitudinal bore therethrough, a drive sleeve 504 rotationally locked to the housing 450, and a top seal cartridge 550. The housing 450 passes through an aperture 452 in the cover 408 of the actuator 401. A shoulder 454 formed by a portion of the housing 450 with an increased outer diameter provides a stop for positioning the housing 450 in the aperture 452 of the cover 408. The housing 450 may be secured to the cover 408 by any known means such as a thread or by welding.

The housing 450 includes an upper bore 509, an inner shoulder 511, a top bore 510, and a bottom bore 512. The inner shoulder 511 is disposed below the upper bore 509, the top bore 510 is disposed below the inner shoulder 511, and the bottom bore 512 is disposed below the top bore 510. The bottom bore 512 has an inner diameter greater than the top bore 510. A tapered shoulder 515 is located at the interface between the top bore 510 and the bottom bore 512.

The top seal cartridge 550 is disposed in the upper bore 509 and can be removed for replacement as a single unit without disassembling the actuator 401 or the mechanical override 400. The top seal cartridge 550 is preferably formed of a plastic-like material such as Delrin and is held in place by at least one retainer ring 552 which is preferably stainless steel. Accessibility to the retainer ring 552 without disassembly of the actuator 401 permits removal of the retainer ring 552 from the top of the housing 450, thereby allowing removal and replacement of the top seal cartridge 550. The top seal cartridge 550 contains dual reciprocating top shaft seals 556 and dual static seals 558 to ensure seal integrity and long life. The top seal cartridge 550 incorporates rod wiper 554 to keep a shaft sealing region therebelow clean of dirt, grease, and other contaminants for longer life of the top shaft seals 556. The rod wiper 554 is preferably made from Molythane 90. These and other seals may be T-seals or other substantially elastomeric seals, such as O-ring seals.

The top shaft 460 extends through the longitudinal bore of the housing 450, the top seal cartridge 550, and the drive sleeve 504. The inner diameter of the inner shoulder 511 is greater than the outer diameter of the top shaft 460, but smaller than the outer diameter of the drive sleeve 504. The inner shoulder 511 permits axial movement of the top shaft 460 therethrough while providing a backstop for the drive sleeve 504. The top shaft 460 may also include a shoulder configured to engage an upper shoulder of the drive sleeve 504 to prevent removal of the top shaft 460 from the upper end of the drive sleeve 504.

The drive sleeve 504 is disposed in the housing 450 and is movable within the top bore 510 and the bottom bore 512. The drive sleeve 504 includes a threaded bore 516 that corresponds with a drive thread 514 on an outside surface of the top shaft 460. In one embodiment, the drive thread 514 is an Acme thread capable of functioning under loads and includes a small number of threads per inch, such as five, in order to decrease the work required to manually operate the actuator 401. The drive thread 514 permits unassisted rotation of the top shaft 460 with the handwheel 500. The threaded engagement permits relative axial movement between the top shaft 460 and the drive sleeve 504 within the housing 450. The outer diameter of the upper portion of the drive sleeve 504 is substantially the same as the inner diameter of the top bore 510 of the housing 450. One or more seals 518, such as o-rings, are provided on the outer diameter of the upper portion of the drive sleeve 504 to form a sealed engagement with the top bore 510 of the housing 450. One or more seals 519, such as o-rings, are provided on the inner diameter of the upper portion of the drive sleeve 504 to form a sealed engagement with the top shaft 460.

Figure 8:
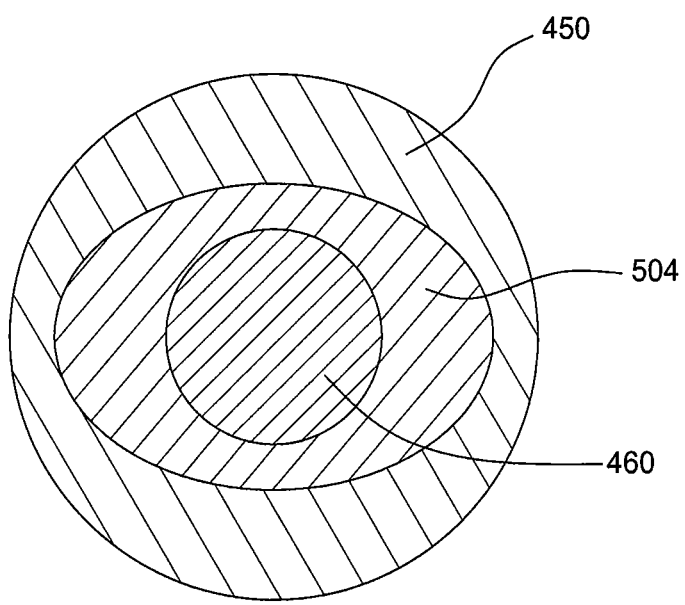
FIG. 8 is a cross-sectional view of the mechanical override along section line 8-8 in FIG. 4.

In one embodiment, the lower end of the drive sleeve 504 is configured to move axially relative to the bottom bore 512 of the housing 450 while being rotationally locked relative to the housing 450. Any known rotational locking assembly that prevents rotation of the drive sleeve 504 while permitting the drive sleeve 504 (and the top shaft 460) to move axially within the housing 450 during the automatic operation of the actuator 401 may be used. FIG. 8 illustrates a new rotational locking assembly by showing one embodiment of a cross-section at sectional line 8-8 in FIG. 4. FIG. 8 illustrates the outer diameter of the lower end of the drive sleeve 504 having an oval shape that corresponds to an oval shape of the inner diameter of the housing 450. The oval shaped diameters provide a physical interference that rotationally locks the drive sleeve 504 to the housing 450 without inhibiting axial movement of the drive sleeve 504 relative to the housing 450. The outer diameter of the drive sleeve 504 and the bore of the housing 450 may be formed in a number of ways known by one of ordinary skill in the art to prevent relative rotational movement while permitting relative axial movement. In one embodiment, the lower portion of the drive sleeve 504 may have one or more splines that extend into one or more corresponding longitudinal grooves formed in the bottom bore 512 of the housing 450 to permit relative axial movement but prevent relative rotational movement. In one embodiment, the lower portion of the drive sleeve 504 may be keyed to the bottom bore 512 with a pin that extends through corresponding longitudinal grooves in the drive sleeve 504 and the bottom bore 512.

A coupling assembly 458 prevents longitudinal separation between a retaining nut 462 secured to the operator member 412 and the top shaft 460 while isolating rotational movement of the top shaft 460 from the actuator 401 and the gate valve 402. The coupling assembly 458 includes a female coupler 464 and ball bearings 468. The lower end of the top shaft 460 rotates around the upper end of the retaining nut 462 and against the ball bearings 468. A bottom shoulder 472 on the top shaft 460 is secured against the ball bearings 468, which are positioned on the upper end of the retaining nut 462, by the female coupler 464. The female coupler 464 is connected to the upper end of the retaining nut 462 and includes an upper shoulder that engages the bottom shoulder 472 of the top shaft 460 to prevent separation of the shaft from the retaining nut 462 and thus the actuator 401 and the gate valve 402. The top shaft 460 freely rotates relative to the retaining nut 462 and eliminates the transmission of torque to the valve stem 414, the sliding gate 416, and/or components of the actuator 401 when using the mechanical override 400.

Embodiments of the invention do not require the coupling assembly connecting the top shaft 460 with the operator member 412. The top shaft 460 of the mechanical override 400 may contact and apply force directly to a portion of the actuator 401, such as the retaining nut 462 or the operator member 412 depending on the type of actuator used. For example, the end of the top shaft 460 may directly contact the upper end of the retaining nut 462. The solid retaining nut 462 may include a separate locking device to prevent the retaining nut 462 from unthreading from the operator member 412 since the top shaft 460 rotates during the manual operation of the mechanical override 400. Alternatively, other known rotation isolation means may be provided to prevent transference of the rotation of the top shaft 460 to other components within the actuator 401 and the gate valve 402.

Referring to FIG. 6, a chamber 610 is formed within the housing 450 between the top seal cartridge 550 and the drive sleeve 504. The chamber 610 is sealed at an upper end by the engagement between the top seal cartridge 550, the upper bore 509, and the top shaft 460, and at a lower end by the engagement between the drive sleeve 504, the top bore 510, and the top shaft 460. Fluid communication may be established between the chamber 610 and the actuator 401 when the drive sleeve 504 is moved into the bottom bore 512, as shown in FIG. 6. In particular, the seals 518 of the drive sleeve 504 are moved across the tapered shoulder 515 into the bottom bore 512, thereby releasing the sealed engagement with the top bore 510. When the drive sleeve 504 is located in the bottom bore 512 and fluid communication is established between the chamber 610 and the actuator 401, the gate valve 402 is operating in the safe mode. When the gate valve 402 is operating in the safe mode, the valve may be moved to the fail-safe closed position (shown in FIG. 4) or the fail-safe opened position (shown in FIG. 12) by the fail-safe mechanism without interference from the mechanical override 400.

The safe mode indicator 403 communicates to a valve operator when the valve is operating in the safe mode. The safe mode indicator 403 includes an indication device 600, such as a sensor, that is connected to the housing 450. The indication device 600 is in fluid communication with the chamber 610 via an orifice 615 located through the housing 450. The pressure in the chamber 610 may be used to actuate the indication device 600 to communicate a signal to the valve operator.

In one embodiment, when the chamber 610 is at a first pressure, the indication device 600 may communicate a first signal to the valve operator to indicate that the valve is not operating in the safe mode. When the chamber 610 is at a second pressure that is different than the first pressure, the indication device 600 may communicate a second signal that is different than the first signal to the valve operator to indicate that the valve is operating in the safe mode. The pressure in the chamber 610 may be the pressure directed into the actuator 401 when fluid communication is established between the chamber 610 and the actuator 401, as shown in FIG. 6. The pressure in the chamber 610 is communicated to the indication device 600 through the orifice 615 to actuate the indication device 600. In one embodiment, the first and/or second pressures may be in a range from about 0 PSI to about 80 PSI, 150 PSI, or greater. In one embodiment, the first and/or second signals may be a visual indication, such as a colored light or marker, an auditory indication, and any other type of signal known to one of ordinary skill.

In one embodiment, the indication device 600 may be any commercial sensor, such as a pressure sensor, that can be used to indicate a pressure change in the chamber 610. In one embodiment, the indication device 600 may be a Rotowink Indicator, commercially available through Norgen Ltd. The Rotowink Indicator is a spring-loaded device actuated by air pressure for use in visual monitoring of pneumatic or fluidic circuits. The device uses two contrasting colors (e.g. black, red, yellow, green) on a rotating ball that can be viewed from any angle to indicate the presence or absence of pressure.

The operation of the invention illustrated in FIGS. 4, 5, 6, 7, 12 will now be described. FIG. 4 illustrates the gate valve 402 in the fail-safe closed position. The spring 418 provides a force configured to bias the valve stem 414, the operator member 412, the top shaft 460, and the drive sleeve 504 in an upward direction, thereby positioning the sliding gate 416 in the closed position. Seating of the sliding gate 416 in the closed position limits the upward axial movement of the top shaft 460 and the drive sleeve 504. The mechanical override 400 is in an un-actuated position and does not interfere with the closing of the gate valve 402. The bias of the spring 418 raises the top shaft 460 to an extended position providing a visual indication that the gate valve 402 is in the closed position. The safe mode indicator 403 may provide a first visual indication that the gate valve 402 is not automatically actuated into the operating safe mode and/or the chamber 610 is not pressurized or has experienced a pressure change.

Figure 12:
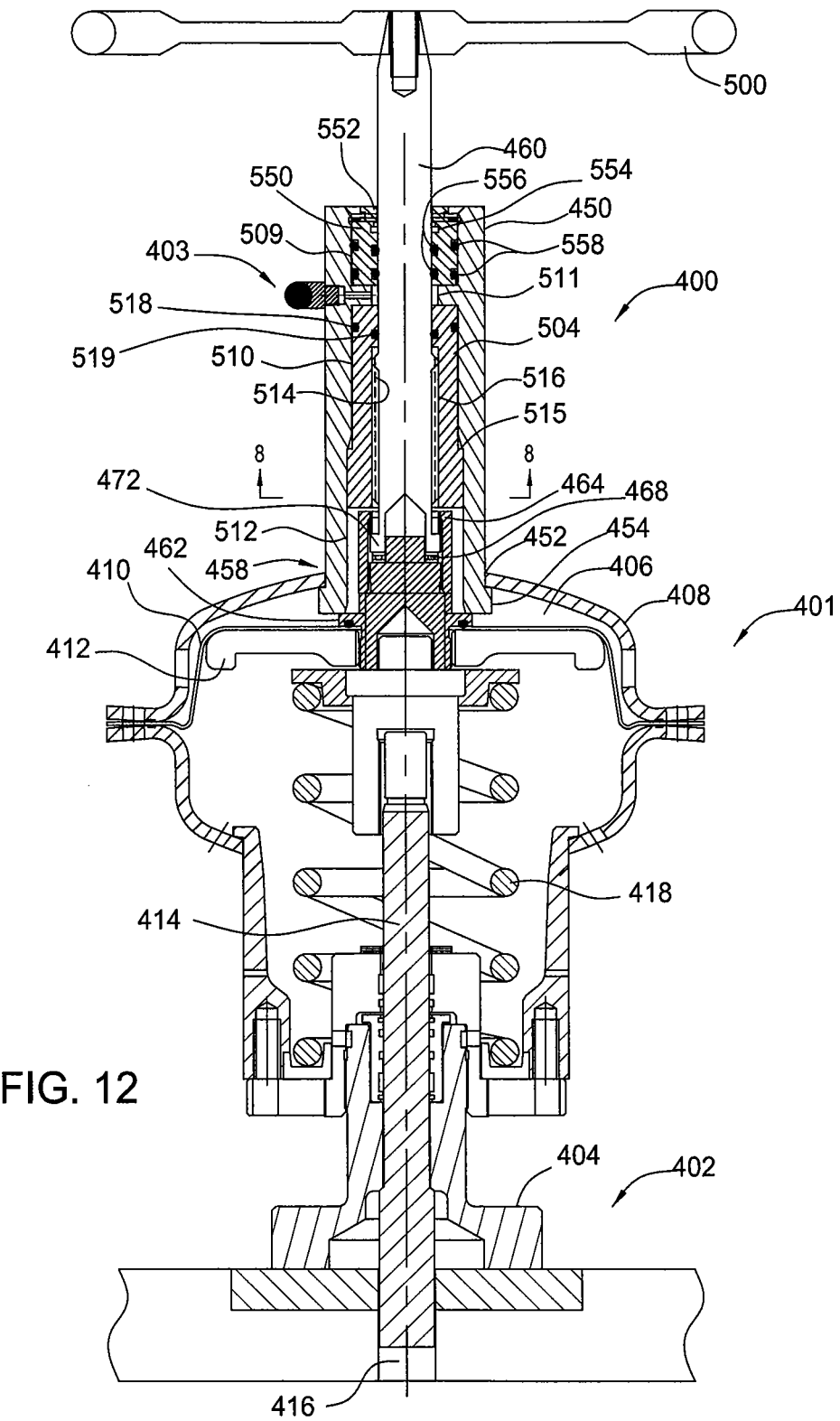
FIG. 12 is a sectional view of a valve in a fail-safe opened position.

FIG. 12 illustrates the gate valve 402 in the fail-safe opened position. The spring 418 provides a force configured to bias the valve stem 414, the operator member 412, the top shaft 460, and the drive sleeve 504 in an upward direction, thereby positioning the sliding gate 416 in the opened position. Seating of the sliding gate 416 in the opened position limits the upward axial movement of the top shaft 460 and the drive sleeve 504. The mechanical override 400 is in an un-actuated position and does not interfere with the opening of the gate valve 402. The bias of the spring 418 raises the top shaft 460 to an extended position providing a visual indication that the gate valve 402 is in the opened position. The safe mode indicator 403 may provide a first visual indication that the gate valve 402 is not automatically actuated into the operating safe mode and/or the chamber 610 is not pressurized or has experienced a pressure change.

Figure 5:
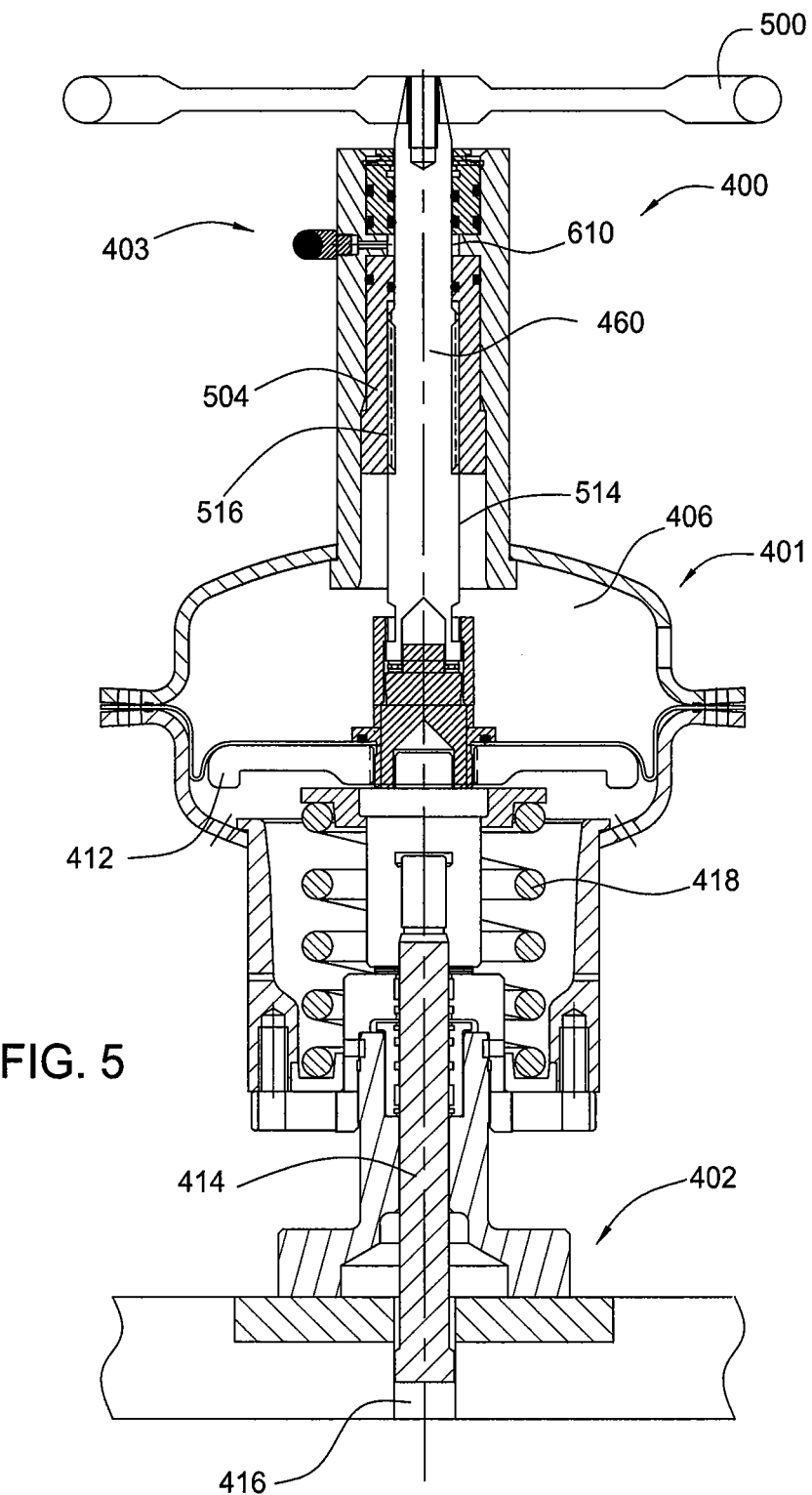
FIG. 5 is a sectional view of the gate valve in an open position after a manual operation of the mechanical override.

FIG. 5 illustrates the gate valve 402 in an open position after a manual operation of the actuator 401 using the mechanical override 400. To move the sliding gate 416 to the open position using the mechanical override 400, the valve operator manually turns the handwheel 500 to provide rotation to the top shaft 460. Rotation of the handwheel 500 rotates the top shaft 460 to advance the top shaft 460 through the drive sleeve 504 across the length of the drive thread 514. As the top shaft 460 rotates, the top shaft 460 advances through the drive sleeve 504 until the upper portion of the drive thread 514 is located at the lower portion of the threaded bore 516 of the drive sleeve 504. During the manual operation, the inner shoulder 511 provides the backstop that prevents the drive sleeve 504 from moving relative to the housing 450. The manual rotation of the handwheel 500 mechanically advances the top shaft 460 through the housing 450 to either directly or indirectly axially move the valve stem 414 to place the gate valve 402 in the open position. The top shaft 460 is mechanically driven against the bias of the spring 418, thereby compressing the spring 418. The top shaft 460 lowers during the manual operation to a retracted position and provides a visual indication that the gate valve 402 is in the open position. The valve operator may also check the safe mode indicator 403 to determine whether the gate valve 402 is operating in the safe mode. The pressure in the chamber 610 should not have significantly changed between the operation of the gate valve 402 from the fail-safe closed position, shown in FIG. 4, to the open position by manual operation, shown in FIG. 5. Thus, the safe mode indicator 403 communicates the same first visual indication to the valve operator, which has not changed by the mechanical operation of the gate valve 402. The safe mode indicator 403 may therefore indicate that the gate valve 402 is not operating in the safe mode, has not been automatically actuated, has been actuated (at least partially) using the mechanical override 400, and/or may be prevented from moving into the fail-safe closed position or the fail-safe opened position.

FIG. 6 illustrates the gate valve 402 in the open position after an automatic operation of the actuator 401. Pressure is directed into the chamber 406 of the actuator 401 to overcome the bias of spring 418 and advance the top shaft 460, the drive sleeve 504, the operator member 412, and the valve stem 414 in a downward direction to position the sliding gate 416 into the open position. The top shaft 460 and the drive sleeve 504 are moved together axially within the bore of the housing 450 until the seals 518 on the drive sleeve 504 are moved across the tapered shoulder 515 and into the bottom bore 512. Fluid communication is established between the chamber 610 and the chamber 406. The pressure in the chamber 406 is communicated to the indication device 600 via the orifice 615, thereby actuating the indication device 600. The pressure change in the chamber 610 actuates the safe mode indicator 403 to communicate a second visual indication that is different than the first visual indication. Since the top shaft 460 also lowers during the automatic operation to the retracted position and provides a visual indication that the gate valve 402 is in the open position, the valve operator may use the safe mode indicator 403 to determine whether the gate valve 402 is operating in the safe mode. The second visual indication may therefore indicate that the gate valve 402 is operating in the safe mode, has not been mechanically actuated, has been automatically actuated, and/or will move into the fail-safe closed position or the fail-safe opened position upon release of pressure in the actuator 401. When operating in the safe mode, the upper end of the drive sleeve 504 is located at least a distance X from the inner shoulder 511 of the housing 450. In this position, the mechanical override 400 will not disable or interfere with the fail safe mechanism. When the pressure in the actuator 401 is released, the drive sleeve 504 is located a sufficient distance from the inner shoulder 511 so as not to limit upward axial movement of the top shaft 460 and thus the valve stem 414 and the sliding gate 416. In this manner, the sliding gate 416 may move into the fail-safe closed position or the fail-safe opened position.

Figure 7:
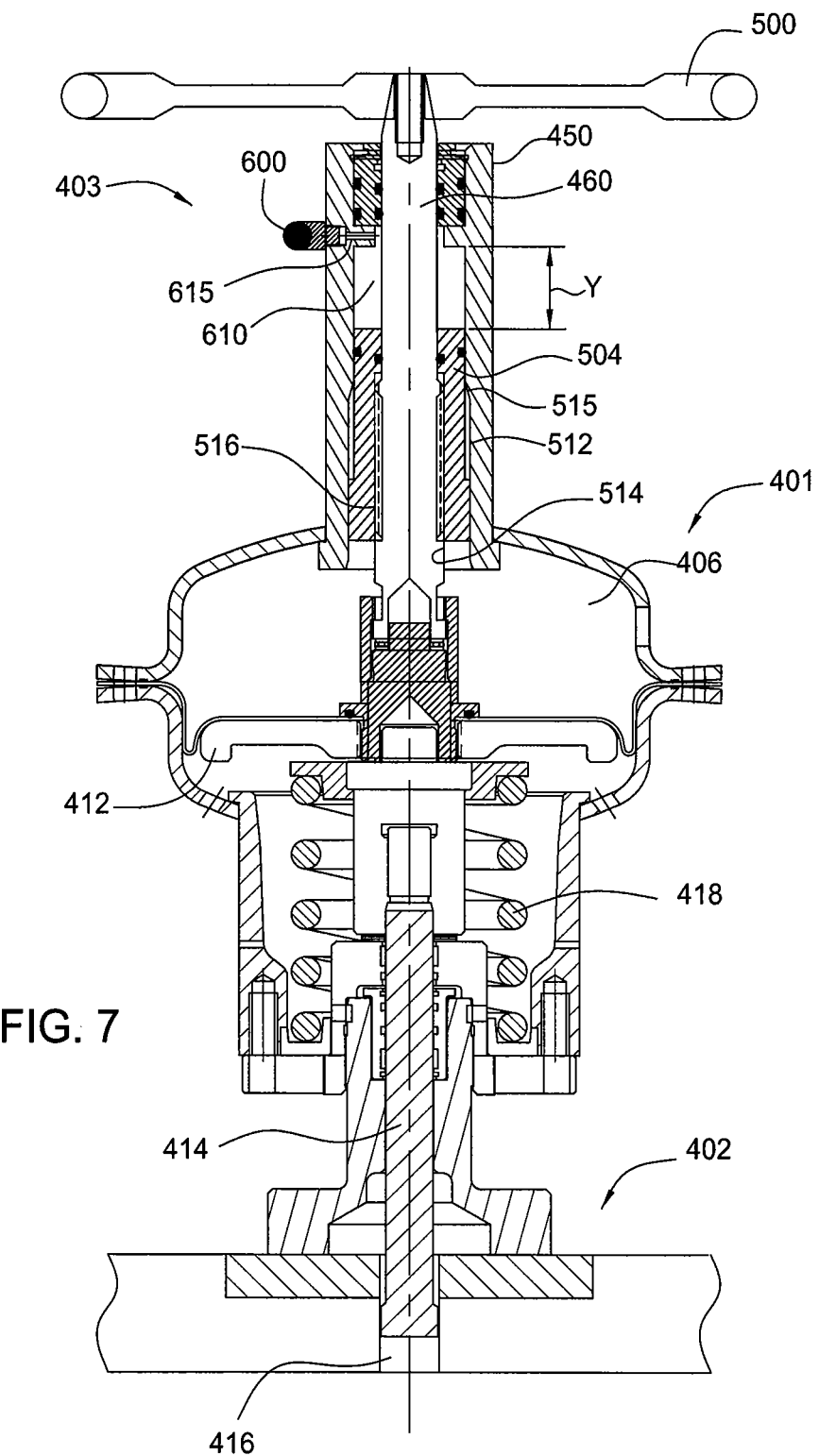
FIG. 7 is a sectional view of the gate valve in the open position after the automatic operation of the actuator, the mechanical override having been partially actuated, and the safe mode indicator indicating that the gate valve is not operating in the safe mode.

FIG. 7 illustrates the gate valve 402 in an open position after an automatic operation of the actuator 401 and a partial operation of the mechanical override 400. Before and/or after automatic actuation of the gate valve 402, the mechanical override 400 may be actuated at least partially, inadvertently or otherwise. If the handwheel 500 has been rotated one or more times, the top shaft 460 and the drive sleeve 504 will move relative to each other in an offset position illustrated in FIG. 7. When in the offset position and if the valve is automatically actuated, then the upper end of the drive sleeve 504 may be positioned a distance Y from the inner shoulder 511, which would prevent the gate valve 402 from moving to the fail-safe closed position or the fail-safe opened position. In one embodiment, the distance Y may be any distance that is less than the distance X identified in FIG. 6. When the pressure in the actuator 401 is released, the upper end of the drive sleeve 504 would backstop on the inner shoulder 511 before the sliding gate 416 closes, and limit the upward axial movement necessary to move the sliding gate 416 into the fail-safe closed position or the fail-safe opened position. Depending on the amount of offset between the drive sleeve 504 and the top shaft 460, the sliding gate 416 may be located in a partially open/closed position. Also, when in the gate valve 402 is automatically actuated and the drive sleeve 504 is located the distance Y from the inner shoulder 511, the chamber 610 remains isolated from fluid communication with the chamber 406 by the seals 518 and 519. Any slight actuation of the mechanical override 400 may offset the top shaft 460 and the drive sleeve 504 enough to prevent the seals 518 from moving across the tapered shoulder 515 during automatic actuation.

Since the top shaft 460 may still visually indicate that the valve 402 is in the open position in FIG. 7, the valve operator may also check the safe mode indicator 403 to determine whether the gate valve 402 is operating in the safe mode. The pressure in the chamber 610 should not have significantly changed since it is isolated from the chamber 406 by the seals 518 and 519. Thus, the safe mode indicator 403 communicates the same first visual indication to the valve operator, which has not changed by the automatic actuation of the gate valve 402. The safe mode indicator 403 may therefore indicate that the gate valve 402 is not operating in the safe mode, has been actuated (at least partially) using the mechanical override 400, and/or may be prevented from moving into the fail-safe closed position or the fail-safe opened position. While the actuator 401 is pressurized, the valve operator may rotate the handwheel 500 to advance the drive sleeve 504 into the bottom bore 512 until the gate valve 402 is operating in the safe mode. The valve operator may rotate the handwheel 500 until the safe mode indicator 403 changes from the first visual indication to the second visual indication, e.g. when fluid communication is established between the chamber 406 and the chamber 610, to ensure that the gate valve 402 is operating in the safe mode. Alternatively, the valve operator may release the pressure in the actuator 401 to permit the drive sleeve 504 to backstop against the inner shoulder 511, and then rotate the handwheel 500 to move the mechanical override 400 into the un-actuated position so that the top shaft 460 and the drive sleeve 504 are not in an offset position as described above. The actuator 401 may be re-actuated automatically so that the safe mode indicator 403 indicates that the valve is operating in the safe mode.

Figure 9:
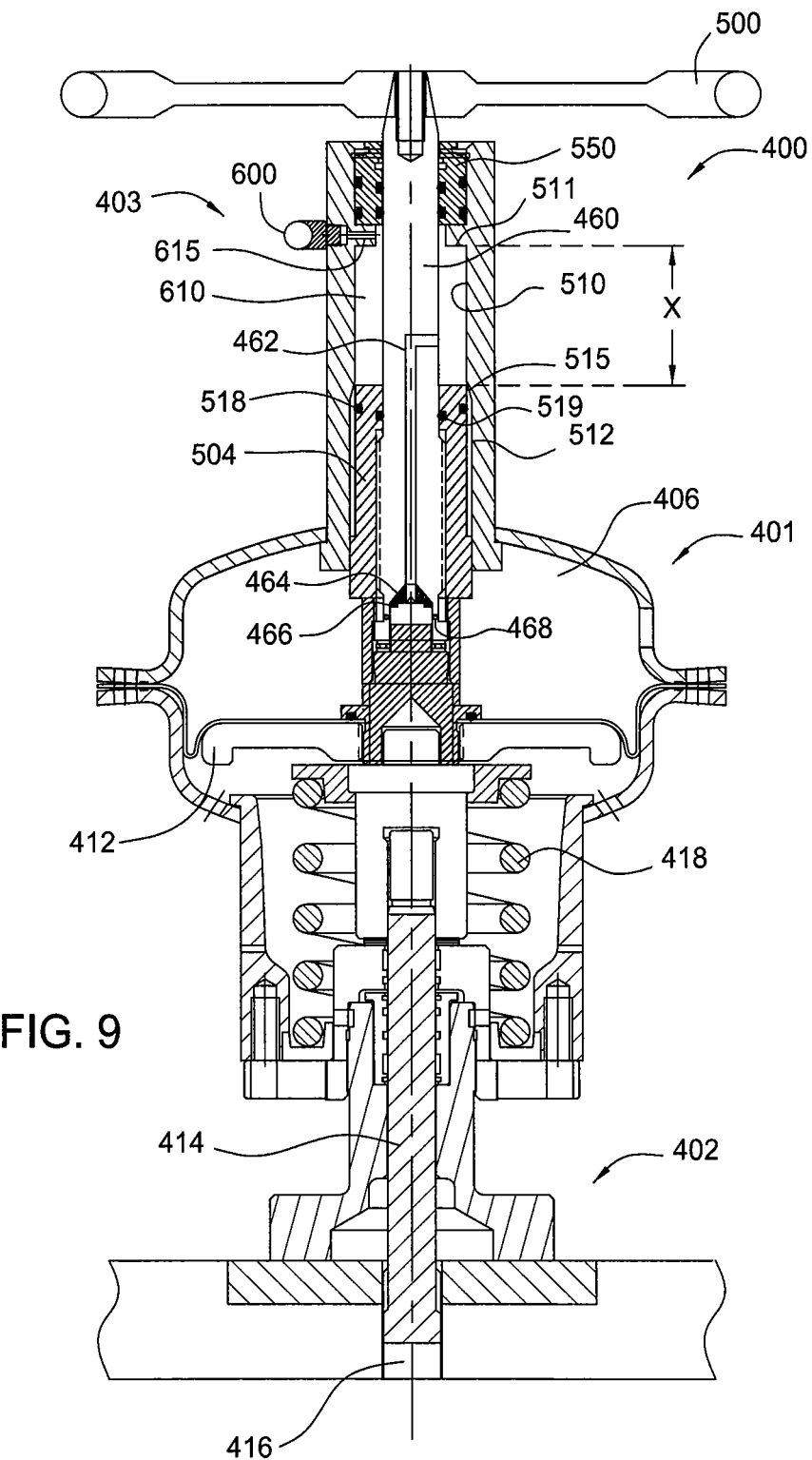
FIG. 9 is a sectional view of the gate valve in an open position after an automatic operation of the actuator.

FIG. 9 illustrates the gate valve 402 in an open position after an automatic operation of the actuator 401 according to one embodiment. The gate valve 402, the actuator 401, and the mechanical override 400 illustrated in FIG. 9 may each include the embodiments described above with respect to FIGS. 4-8. FIG. 9 further illustrates a bore 462 disposed through the top shaft 460, a check valve 464 disposed in a lower end of the top shaft 460 and in communication with the bore 462, and a retaining member 466 coupled to the top shaft 460 to support the check valve 464 in the lower end of the top shaft 460. In one embodiment, the bore 462 may be disposed through the top shaft 460 in any manner known by one of ordinary skill in the art to allow fluid communication between the chamber 610 and the chamber 406. In one embodiment, the check valve 464 may be any type of valve known by one of ordinary skill in the art, such as a one-way valve, that is operable to control the flow of fluid through the bore 462 in either direction. In one embodiment, the retaining member 466 may be any type of member known by one of ordinary skill in the art, such as a retainer ring, that is operable to maintain the check valve 462 in engagement with the top shaft 460 and/or the bore 462. The top shaft 460 illustrated in FIG. 9 may be used in any of the embodiments described with respect to FIG. 4-8.

In operation, the bore 462 may be configured to relieve any fluid pressure that is located in the chamber 610, which may cause a pressure lock and prevent the fail-safe mechanism from closing the gate valve 402. For example, when the gate valve 402 is operating in the safe mode as illustrated in FIG. 9, the chamber 610 is in fluid communication with the chamber 406 of the actuator 401 and is filled with pressurized fluid. As the pressure in the chamber 406 is reduced, the spring 418 begins to move the gate valve 402 into the closed position, as illustrated in FIG. 4, and the chamber 610 is sealed upon engagement of the seals 518 with the inner surface of the top bore 510. Any fluid that may be retained in the chamber 610 is relieved through the bore 462 into the chamber 460. In one embodiment, the fluid may be forced through the bore 462 and the check valve 464 under its own pressure and/or as it is pressurized as the volume of the chamber 610 is reduced by movement of the drive sleeve 504 toward the shoulder 511 via the spring 418. The check valve 464 may allow fluid to flow from the upper end of the top shaft 460, through the bore 462 and into the chamber 406, and prevent fluid from flowing into the bore 462 and thus into the chamber 610 from the lower end of the top shaft 460. In one embodiment, the top shaft 460 may include one or more ports 468 located adjacent to the outlet of the check valve 464 to assist with venting fluid pressure into the chamber 406. In one embodiment, one or more seals 519 may be situated between the top shaft 460 and the drive member 504 to prevent any unintended leak paths from communicating fluid to the bore 462 during operation of the gate valve 402.

In one embodiment, the ESD Control Systems 200, 300, 700 described herein with respect to FIGS. 1-3 and 13 may be used in combination with the mechanical override 400, the actuator 401, the gate valve 402, and/or the safe mode indicator 403 as described herein with respect to FIGS. 4-9. In one embodiment, the pressure transducer 280 illustrated in FIG. 2 can be connected to the housing 450, similar to the indication device 600 illustrated in FIGS. 6, 7, and 9. The pressure transducer 280 may be operable to measure the pressure in the chamber 610 via the orifice 615 and send a signal to the controller assembly 220 corresponding to the measured pressure. The controller assembly 220 may then send a signal to the computer system 150 via wired or wireless telemetry for monitoring and display of the measured pressure in real time. In this manner, the ESD control systems 200, 300, 700 can be used to remotely monitor and verify whether the gate valve 402 is operating in the safe mode as described above.

FIGS. 10A-10H and 11-11D illustrate a valve assembly 1000 according to one embodiment. FIGS. 10A-10H illustrate a top perspective view, a left side view, a bottom perspective view, a front view, a top view, a right side view, a bottom view, and a rear view, respectively, of the valve assembly 1000. FIG. 11 illustrates a top view of the valve assembly 1000, and FIGS. 11A-11D illustrate cross sectional views A-A, B-B, C-C, and D-D, respectively, of the valve assembly 1000. The valve assembly 1000 may be used as the valve assembly 260 described above. The valve assembly 1000 includes a first body portion 1010, a second body portion 1015, a first seat 1020, and a second seat 1030. The first and second body portions 1010, 1015 may be formed from a single piece of material, or may include two separate pieces of material that are connected together. The first and/or second seats 1020, 1030 may be removably secured to the first body portion 1010 for accessing a gate 1055 that is movably disposed in the first body portion 1010 to control fluid communication therethrough. The first and second body portions 1010, 1015 may be provided with one or more mounting holes 1011, 1012, 1013 for securing the valve assembly 1000 within the housing 210 and/or to one or more components of the ESD control systems 200, 300. The first body portion 1010 may include a first fluid inlet 1040 for receiving fluid from the pump assembly 240. The first fluid inlet 1040 may include a fluid path 1041 disposed through the first body portion 1010 from a first end to a second end, adjacent to the first seat 1020. Second and third fluid inlets 1042, 1045 (the third fluid inlet 1045 being disposed through the first seat 1020) may optionally be provided to receive fluid from the pump assembly 240. As illustrated, the optional second and third fluid inlets 1042, 1045 are plugged with one or more sealing members, but include fluid paths that are in communication with the fluid path 1041 of the first fluid inlet 1040. The first body portion 1010 may also include a first fluid outlet 1050 for directing fluid to the actuator of the surface and/or subsurface safety valves 120, 130 to actuate the valves. The first fluid outlet 1050 may also include a fluid path 1051 disposed through the first body portion 1010 from a first end to a second end, adjacent to the second seat 1030. The first body portion 1010 may further include a fluid path 1052 that extends from the first seat 1020 to the second seat 1030 to provide fluid communication between the first fluid inlet 1040 and the first fluid outlet 1050. The gate 1055 may be disposed in the fluid path 1052 between the first and second seats 1020, 1030 to control fluid communication between the first fluid inlet 1040, the first fluid outlet 1050, and a first relief outlet 1060 of the second seat 1030 as described below. One or more machining holes 1051, 1052 (illustrated as being plugged) may be formed in the first body portion 1010 to form the fluid paths disposed through the body as described herein.

During operation, fluid may flow through at least one of the fluid inlets 1040, 1042, 1045 past the gate 1055 that is disposed within the fluid path 1052 of the first body portion 1010 between the first and second seats 1020, 1030, and then through the fluid outlet 1050. While fluid is flowing through the valve assembly 1000 to the actuators of the valves 120 and/or 130, the pressure in the first body portion 1010 forces the gate 1055 to seal off communication with the first relief outlet 1060. The first relief outlet 1060 provides fluid communication to the fluid reservoir 250, to dump the fluid in the first body portion 1010 and the valve actuators when desired during operation. A second relief outlet 1070 may also be provided to quickly release fluid from the first body portion 1010 and the valve actuators. The second relief outlet 1070 may include a fluid path 1071 that intersects the fluid path 1041 of the first fluid inlet 1040, but which includes an in-line relief valve to release fluid from the fluid paths to the fluid reservoir 250 in the event that the pressure in the first body portion 1010 exceeds a pre-determined pressure. A pressure switch port 1019 may be disposed through the first body portion 1010 that intersects the fluid path 1051 of the first fluid outlet 1050. The pressure switch port 1019 may be used as a means to communicate the pressure in the first body portion 1010 to one or more sensors/transducers that are in communication with the ESD control systems 200, 300 and/or the controller assemblies 220, 320. Using the pressure measured by the sensors/transducers via the pressure switch port 1019, the controller assemblies 220, 320 may selectively control, e.g. turn on and off, the pump assemblies 240, 340 to actuate the valves 120, 130 as described herein.

The second body portion 1015 may include a fluid control outlet 1090 that directs flow from the fluid path 1041 of the first fluid inlet 1040 via a fluid path 1091 to a control valve assembly, such as a solenoid valve assembly. The solenoid valve assembly may also be in communication with the controller assemblies 220, 320 to control operation (e.g. open and close) of the valve assembly 1000 to thereby control actuation of the valves 120, 130 as desired. The second body portion 1015 may further include a second fluid control outlet 1080 to release fluid from the fluid paths in the second body portion 1015 via a fluid path 1081 and the control valve assembly to the fluid reservoir 250. When the control valve assembly is actuated to dump fluid pressure to the fluid reservoir 250, the pressure release in the fluid path 1041 of the first fluid inlet 1040 and the back pressure in the fluid path 1051 of the first fluid outlet 1050 may move the gate 1055 to a position within the first body portion 1010 where the fluid in the first body portion 1010 and the valve actuators is quickly released to the fluid reservoir 250 via the first relief outlet 1060, the second relief outlet 1070, and/or the second fluid control outlet 1080. In this manner, the valve assembly 1000 may be selectively used to supply and maintain fluid in one or more valve actuators of the valves 120, 130, and to selectively release and dump fluid from the valve actuators to the fluid reservoir 250.

Figure 13:
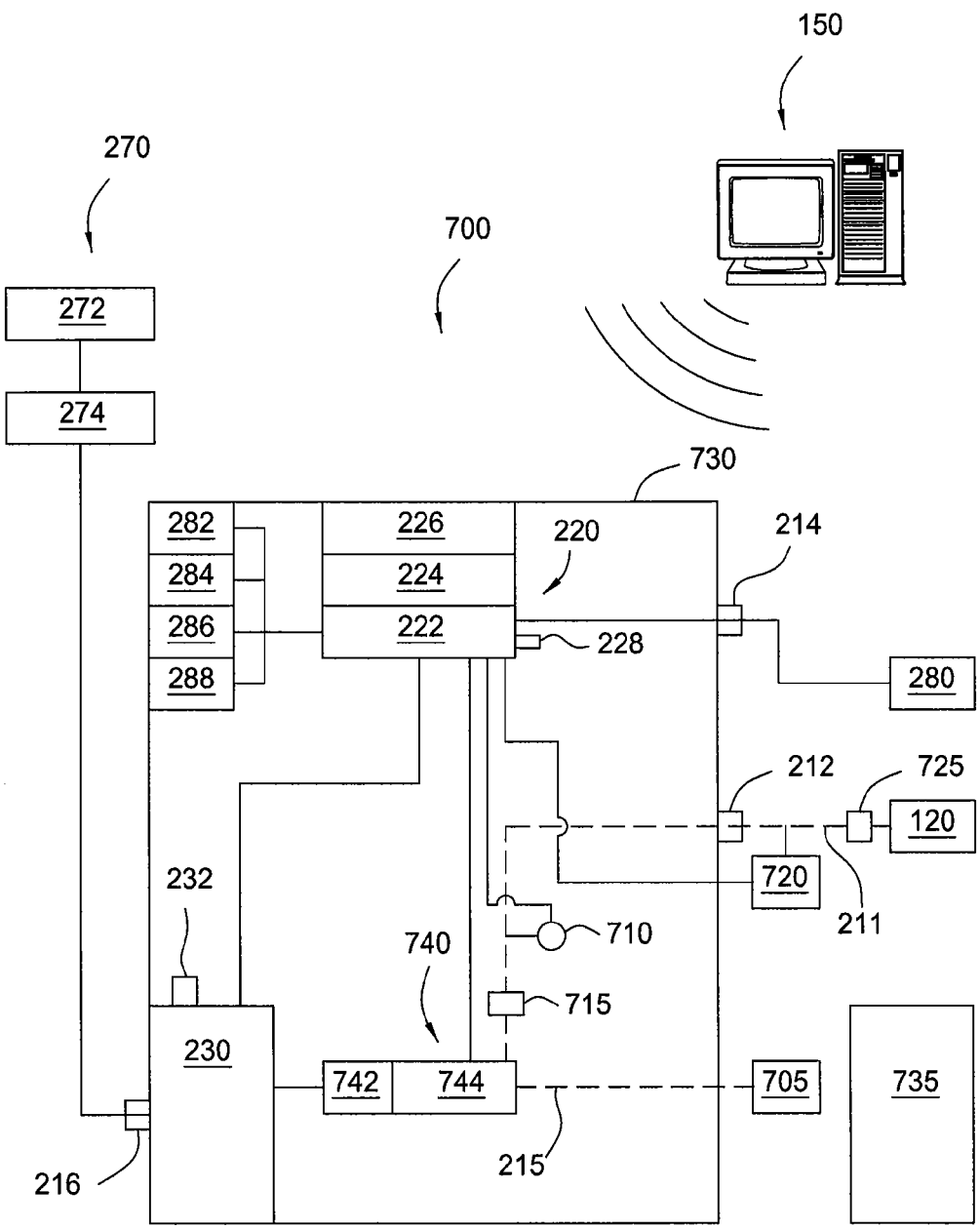
FIG. 13 illustrates a safety valve control system according to one embodiment.

FIG. 13 illustrates the ESD control system 700 according to one embodiment. Embodiments of the ESD control system 700 described herein may be applicable to the ESD control system 300. For convenience, the components in the ESD control system 700 that are similar to the components in the ESD control system 200 will be labeled with the same number indicator. The ESD control system 200 may include the housing 730 for supporting the controller assembly 220, the power source 230, a compressor (or fluid drive) assembly 740, a check valve 715, a pressure switch 710, a filter/dryer assembly 705, and the solar panel assembly 270. In one embodiment, the controller assembly 220 and/or any of the other components may be disposed external to and/or adjacent to the housing 730.

The ESD control system 700 may be "self-contained" or "stand-alone unit," which means that the ESD control system 700 does not depend on any external pneumatic, hydraulic, mechanical, or electrical sources for its operation to shut down the oil/gas well. In other words, the power source 230, the compressor assembly 740 and other components are within the housing 730 and thus the ESD control unit 700 is an integral portable unit. For example, if there is a rupture of a production flow line downstream from the surface safety valve 120, and/or if there is a loss of well pressure at the subsurface safety valve 130, the ESD control system 700 is operable to effectively close the safety valves 120, 130, thereby shutting in the oil/gas well, and alert the appropriate personnel that a shut-in has occurred without the assistance of any additional external power sources, such as external compressors or motors.

The ESD control system 700 may also include one or more transducers/devices 280, 282, 284, 286, and 288 for monitoring and/or measuring one or more physical properties as described herein. The ESD control system 700 may be configured to control one or more valves, such as flow control valves or choke valves that are in communication with the flow lines of the valves 120, 130 to control fluid flow through the wellhead control system 100. The ESD control system 700 may also include a quick dump valve 725 in line 211. The quick dump valve 725 is a manual valve that is configured to exhaust pneumatic fluid to an area outside of the housing 730. Additionally, the check valve 715 may be located in the line 211. The check valve 715 is a valve that allows fluid flow in one direction, from the compressor assembly 744 to the valve 120, and restricts fluid flow in the opposite direction.

The housing 730 may include any structural support member, such as an explosion-proof container, for protecting the components stored therein from damage and environmental elements. Appropriate ventilation of the housing 730 may be provided by ventilation holes and/or an independent solar powered fan mounted in or through the housing 730. The housing 730 may further include an access panel or door for ease of access to the housing's interior, and may be configured for attachment to the tree 110 or the respective surface and subsurface safety valve 120, 130. In one embodiment, the structural components of the ESD control system 700, to the extent possible, may be made from stainless steel. The controller assembly 220 may be disposed in the housing 730 and may include a microprocessor unit 222, a display screen 224, and a keypad 226. In one embodiment, the controller assembly 220 may be weather-proof, and may be intrinsically safe to provide power as necessary to one or more components of the ESD control system 700. The microprocessor unit 222 may include a programmable logic controller, including a supervisory control and data acquisition system (SCADA) that is in communication with the one or more transducers/devices 280, 282, 284, 286, and 288, as well as the compressor assembly 740 and valve assemblies 710, 720.

In one embodiment, the compressor assembly 740 may include an intrinsically safe motor 742 and a compressor 744, which may each be located in the explosion-proof housing 730. As set forth herein, the compressor assembly 740 may supply pneumatic fluid from a location outside the housing 730 to actuate the safety valve 120, 130 to which it is connected. The pneumatic fluid may be ambient fluid, such as air, outside the housing 730. In one embodiment, the compressor assembly 740 may have multiple compressors and/or motors in parallel.

In one embodiment, the pneumatic fluid may be supplied from an optional reservoir 735 located outside of the housing 730. The reservoir 735 may be connected to the filter/dryer assembly 705 for supplying fluid to the compressor assembly 740. The reservoir may also be connected to the valve assembly 720 and/or valve 725 for receiving fluid exhausted from the system. The reservoir 735 may include a level gauge, such as a sight glass, to indicate the level of fluid in the reservoir 735. The reservoir 735 may also include a level sensor that is in communication with the controller assembly 220 and is operable to monitor in real-time the level of fluid in the reservoir 735. In the event that the level of fluid falls below a predetermined limit (e.g. pre-set limit), due to evaporation of the fluid for example, the level sensor may provide an alarm to alert an operator on-site at the wellhead control system 100 and/or at the remote location via the controller assembly 220 and the computer system 150. The controller assembly 220 may automatically shut in the wellhead control system 100 upon receiving a signal from the level sensor.

As set forth herein, the signal from the pressure transducer 280 may be recorded and/or communicated to the computer system 150 via the controller assembly 220 to provide real-time monitoring of the pressure in the flow line 135. The measured pressure may be displayed on the display screen 224 and/or on a display screen of the computer system 150. In response to the comparison of the measured pressure to one or more predetermined conditions, the controller assembly 220 may be configured to operate the respective safety valve 120, 130 to which it is connected. For example, the controller assembly 220 may be used to direct the compressor assembly 740 to supply pneumatic fluid, such as ambient air, to the surface safety valve 120 to open the valve. Upon receiving the signal from the controller assembly 220, the valve assembly 720 may be configured to open a circuit defined by lines 211, 215 between the surface safety valve 120 and the filter/dryer assembly 705 to allow the compressor assembly 740 to direct fluid from the fluid entering the filter/dryer assembly 705 to the surface safety valve 120, thereby opening the surface safety valve 120. The surface safety valve 120 may be maintained in the open position while the pressure transducer 280 continuously monitors the pressure in the flow line 135. The controller assembly 220 may be programmed to close the surface safety valve 120 upon receiving a signal from the pressure transducer 280 that corresponds to a pressure measurement that is greater than or less than a pre-set pressure range. The pre-set pressure range may be input into the controller assembly 220 by manual entry using the keypad 226 and the display screen 224. The pre-set pressure range may also be input into the controller assembly 220 remotely from the computer system 150. When the signal is received from the pressure transducer 280 that the pressure in the flow line 135 falls outside of the pre-set pressure range stored in the microprocessor unit 222, the controller assembly 220 may automatically direct the compressor assembly 740 to stop supplying pressurized fluid to the surface safety valve 120 and/or allowing the valve assembly 720 to exhaust the pneumatic fluid, thereby closing the surface safety valve 120. Continuous real-time monitoring of the pressure in the flow line 135 may be used to verify that the surface safety valve 120 has been closed.

Power may be provided to the controller assembly 220 and the compressor assembly 740 from the power source 230. The power source 230 may be operable to provide a low current (amp) stream to the controller assembly 220 and/or the compressor assembly 740. The controller assembly 220 is configured to control the pressure switch 710, which can be visually inspected to monitor the pressure in the line 211. In one embodiment, the pressure switch 710 may be configured to shut off the compressor assembly 740 when the pressure in the actuator of the safety valves 120, 130 reaches a predetermined pressure setting.

Figure 14:
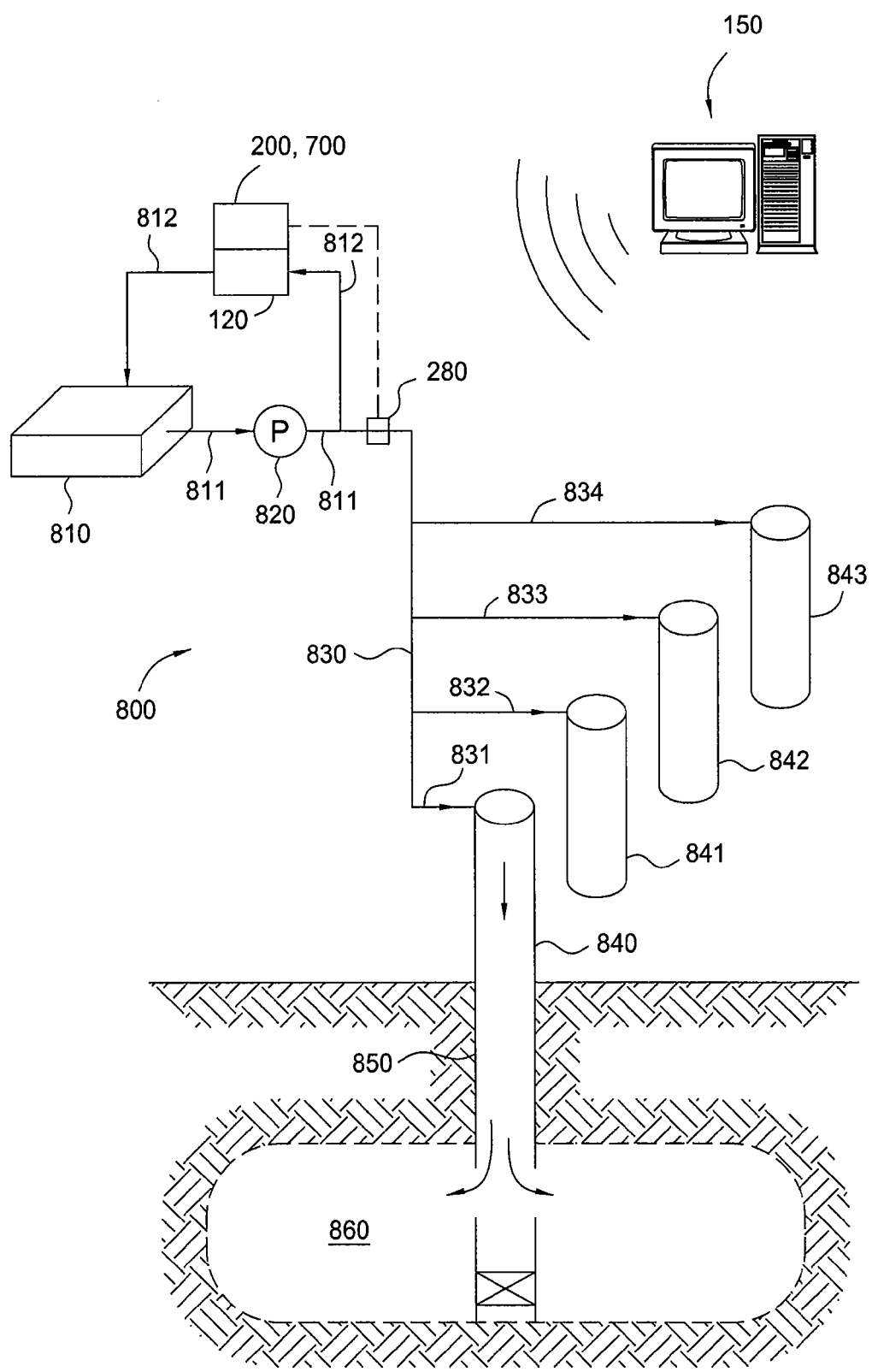
FIG. 14 illustrates a well control system according to one embodiment.

FIG. 14 illustrates a well control system 800 at a wellsite for conducting a wellbore operation, such as a fracturing operation. The well control system 800 may be configured with one or more of the control systems 200, 300, 700 as described herein. The well control system 800 includes a fluid supply 810, such as a reservoir or tank, or a vehicle comprising a storage tank for storing fluid. A pump 820, or other fluid drive assembly, is provided for pumping fluid from the fluid supply 810 to a well. In particular, fluid from the fluid supply 810 is pumped through flow or fluid line 811 to a manifold 830, which directs the pressurized fluid to one or more wellheads 840, 841, 842, 843 via fluid lines 831, 832, 833, 834, respectively. As illustrated, the wellhead 840 may control the pressurized fluid flow into a well 850 that intersects a formation 860 for conducting a fracturing operation as conventionally known in the art.

A fluid line 812 is in fluid communication with the fluid line 811 at a location downstream of the pump 820. The fluid line 812 may also be in fluid communication with the fluid supply 810 or with any other fluid reservoir type assembly. The safety valve 120 is in-line with the fluid line 812 for controlling fluid flow from the fluid line 811 to the fluid supply 810. The safety valve 120 may be configured as a fail-safe open relief valve or a fail-safe close safety valve, and is operable using one or more of the control systems 200, 300, 700. The safety valve 120 is operable using a pneumatic/hydraulic working fluid, which may be supplied from a fluid reservoir internal or external of the control systems 200, 300, 700 (as described herein) and/or from the fluid supply 812 directly or via one of the fluid lines. The transducer 280, such as a pressure transducer, measures the pressure in the fluid line 812 and communicates the measured characteristic to the controller assemblies of the control systems 200, 300, 700, which compare the measured characteristic to one or more predetermined conditions. The computer system 150 enables remote monitoring, control and operation of the safety valve 120 using the control systems 200, 300, 700 as described herein.

In one embodiment, one or more fluid lines 812 may be provided for fluid communication between fluid lines 811, 831, 832, 833, 834 (including the manifold and/or wellheads) and the fluid supply 810 or other fluid reservoir. In one embodiment one or more safety valves 120 and/or control systems 200, 300, 700 may provided in-line with one or more of the fluid lines 811, 831, 832, 833, 834 (including the manifold and/or wellheads). In one embodiment, one or more transducers 280 may be provided for measuring physical properties (e.g. pressure, temperature, flow rate, flow volume, etc.) of one or more of the fluid lines 811, 831, 832, 833, 834 (including the manifold and/or wellheads).

In operation, the pump 820 may be actuated to pump fluid from the fluid supply 810 to the manifold 830 via fluid line 811. The safety valve 120 may be actuated into a closed position using a working fluid as directed by the control systems 200, 300, 700 to prevent or substantially restrict fluid flow through fluid line 812. The pressurized fluid may therefore be directed from the manifold 830 to the wellheads 840, 841 842, 843 via fluid lines 831, 832, 833, 834 for conducting a fracturing operation, such as in well formation 860. The safety valve 120 may be continuously monitored remotely using the computer system 150. The transducer 280 may also continuously monitor and measure physical properties, such as fluid pressure, in fluid line 811 and communicate the measured physical properties to the control system 200, 300, 700 for comparing to one or more predetermined conditions. In the event that the pressure in the fluid line 811 exceeds a predetermined condition (as programmed into the controller assembly of the control system), the control system is operable to release the working fluid from maintaining the safety valve 120 in the closed position, and the safety valve 120 is operable to automatically move into the open position (such as by spring 418 or other biasing member) to relieve the pressure in the fluid line 811 and dump the pressurized fluid back into the fluid supply 810 or other reservoir via fluid line 812. The well control system 800 is therefore operable to prevent over pressurization or other conditions of the fluid lines 811, 831, 832, 833, 834 (including the manifold and/or wellheads) that can lead to failure.

After any remedial operations necessary to remove any restriction to flow to the wellheads, the control system 200, 300, 700 may be operable to actuate the safety valve 120 into the closed position to continue with one or more wellbore operations. Advantages of the well control system 800 include the ability to relieve high fluid volume, flow, and pressure quickly, efficiently, and repeatedly to prevent failure of the wellbore system. Additional advantages include the ability to remotely monitor and control the system 800.

In one embodiment, the control system 200, 300, 700 may be configured to actuate the safety valve 120 at a predetermined condition, such as a set pressure, which is below the rated working pressure of one or more of the fluid lines, manifolds, and/or wellheads. In the event that the pressure in the fluid lines reach or exceed the predetermined set pressure (as measured by the transducer 280), the control system 200, 300, 700 will actuate the safety valve 120 into the open position to relieve the excessive fluid pressure. In one embodiment, the control system 200, 300, 700 may be configured with a predetermined condition, such as a reset pressure. For example, in the event of actuation of the safety valve 120 due to a failure, the control system 200, 300, 700 may prevent operation of the safety valve 120 back into the closed position until the transducer 280 measures the predetermined reset pressure in the fluid lines.

In one embodiment, the control system 200, 300, 700 may be configured to actuate the safety valve 120 in anticipation of a failure. For example, the control system 200, 300, 700 may include an electronic wave generator for generating a wave signal that corresponds to fluid flow volume, rate, pressure, etc., and which is monitored by the controller assembly for any changes or fluctuations that indicate a failure at one or more points in the well control system 800. In the event of an indication of failure, the control system 200, 300, 700 can operate the safety valve 120 for actuation into the open position.

In one embodiment, the control system 200, 300, 700 can monitor, track, and record the operation of the safety valve 120 and/or the transducer 280 measurements. In one embodiment, the control system 200, 300, 700 may be configured with one or more mechanical and/or electrical overrides for independent, manual, or direct operation of the safety valve 120. In one embodiment, a transducer 280 may be coupled to the safety valve 120 to monitor the working pressure within the valve actuator, which can help determine life of the valve, force required to actuate, and whether maintenance is required.

In one embodiment, the control system 200, 300, 700 may be configured to trigger or actuate one or more alarms or alerts (audio/visual) to indicate a potential or actual failure; that the safety valve 120 has been actuated; and/or one or more other conditions have been detected, such as H2S (or other harmful gases), fire, and/or damage to the control system. In one embodiment, the alarms or alerts may be communicated through the computer system 150. In one embodiment, the control system 200, 300, 700 may be configured to prevent remote operation in the event that the safety valve 120 has been actuated, and may require manual re-setting of the system.

In one embodiment, the control system 200, 300, 700 may include a geographical positioning system for tracking the location of the control system and the safety valves, which may be displayed, monitored, and tracked using the computer system 100. In one embodiment, the control system 200, 300, 700 may store information related to a particular wellbore operation, including maintenance and operational history, employee contact information, and/or status of the safety valve. In one embodiment, the control system 200, 300, 700 may be configured to open and/or close the safety valve 120 within a predetermined time frame. In one embodiment, the control system 200, 300, 700 may be configured to actuate the safety valve 120 at one or more predetermined time intervals.

Figure 15:
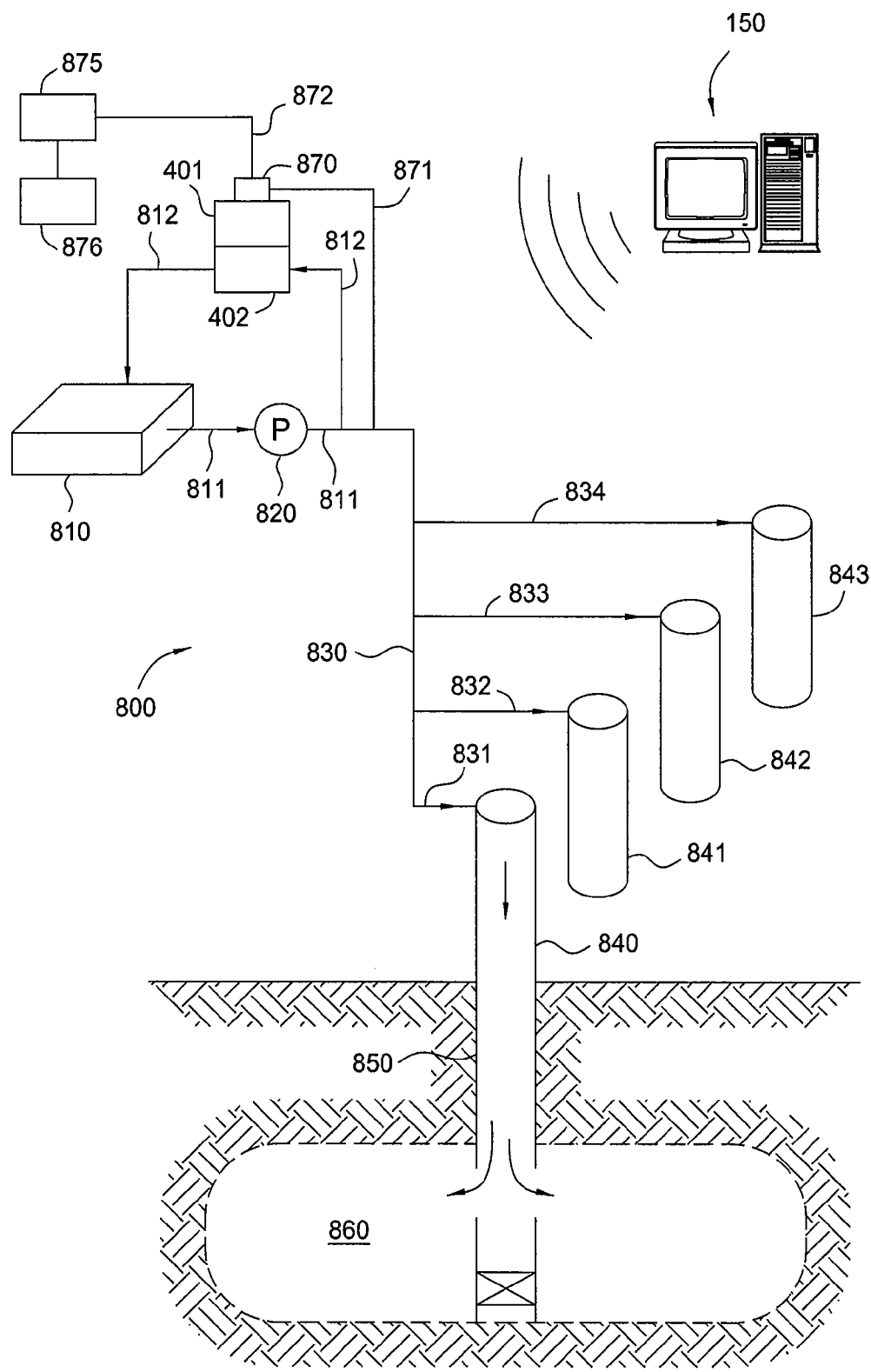
FIG. 15 illustrates the well control system according to one embodiment.

FIG. 15 illustrates the well control system 800 according to one embodiment. The well control system 800 includes a gate valve 402 and a valve actuator 401, the operations of which are described above with respect to at least FIGS. 4-12. A pilot valve 870 (or other functionally similar type of mechanical, electrical, and/or hydraulic sensor) may be coupled to the valve actuator 401, and may be operable to control fluid communication between the valve actuator 401 and a fluid reservoir 875 via fluid line 872. A pump 876 may be provided to pump actuator fluid from the reservoir 875 to the valve actuator 401 to actuate the valve 402 into the closed position.

Upon actuation of the pilot valve 870, the actuator fluid may be released from the valve actuator 401 back to the reservoir 875, such that the valve 402 may be automatically biased into the open position. The pilot valve 870 may be actuated by fluid pressure via fluid line 871, which is in communication with fluid line 811. In the event that fluid pressure directed to the wellheads 840-843 exceeds a predetermined amount, the fluid pressure will actuate the pilot valve 870 (via fluid line 871) to release the actuator fluid from the valve actuator 401 to the reservoir 875 (via fluid line 872), and thereby automatically bias the valve 402 into the fail safe open position to release the excessive fluid pressure back to the fluid supply 810 (via fluid line 812) as described above.

In one embodiment, the pilot valve 870 may operate as a check valve or one-way valve when in an un-actuated or first position, to allow actuator fluid to be pumped into the valve actuator 401 while preventing actuator fluid flow out of the valve actuator 401. When the pilot valve 870 is in an actuated or second position, actuator fluid may flow out of the valve actuator 401 to the reservoir 875. The pilot valve 870 may monitor and be in communication with the fluid pressure in any one of the flow lines 811 and 830-834. In one embodiment, the actuator fluid may be forced into the reservoir 875 by the biasing member 418 acting on the operating member 412 as described above.

While the foregoing is directed to embodiments of the invention, other and further embodiments of the invention may be devised without departing from the basic scope thereof, and the scope thereof is determined by the claims that follow.

The invention claimed is:

1. A control system for controlling fluid flow through a flow line at a wellsite, the control system comprising:
a fluid supply;
a first fluid line in fluid communication with the fluid supply;
a pump in fluid communication with the first fluid line and configured to pump fluid from the fluid supply to one or more wellheads through the first fluid line;
a second fluid line in fluid communication with the first fluid line at a location downstream of the pump and configured to return fluid from the first fluid line to the fluid supply;
a safety valve in-line with the second fluid line and having a gate normally maintained in a closed positon to close fluid flow through the second fluid line;
a valve actuator configured to move the gate into the closed position by fluid supplied into the valve actuator and configured to move the gate into an open position by a biasing member disposed in the valve actuator;
an electronic controller assembly programmed with a predetermined condition and configured to receive a signal from a transducer connected to the first fluid line, wherein the signal corresponds to a measured physical property;
a valve assembly in communication with the controller assembly; and
a fluid drive assembly in communication with the controller assembly, wherein the controller assembly is operable to actuate the fluid drive assembly to supply fluid into the valve actuator to move the gate into the closed position, and wherein the controller assembly is operable to actuate the valve assembly in response to a comparison of the measured physical property to the predetermined condition to release the fluid from the valve actuator so that the biasing member moves the gate into the open position, forces the fluid out of the valve actuator, and thereby opens fluid flow through the second fluid line to return fluid in the first fluid line back to the fluid supply.

2. The system of claim 1, further comprising a housing for supporting the controller assembly, the valve assembly, and the fluid drive assembly.

3. The system of claim 2, wherein the fluid supplied into the valve actuator by the fluid drive assembly is supplied from a reservoir disposed outside of the housing.

4. The system of claim 1, wherein the fluid drive assembly is a compressor and the fluid is a pneumatic fluid.

5. The system of claim 1, wherein the fluid drive assembly is a pump and the fluid supplied into the valve actuator by the fluid drive assembly is a hydraulic fluid.

6. The system of claim 1, further comprising a power source for supplying power to the controller assembly, the valve assembly, and the fluid drive assembly.

7. The system of claim 1, further comprising a housing for supporting the fluid drive assembly, and a filter attached to the housing for filtering fluid entering the housing by the fluid drive assembly.

8. The system of claim 1, wherein the fluid supplied into the valve actuator by the fluid drive assembly is ambient air.

9. The system of claim 1, wherein the controller assembly is operable to communicate a signal corresponding to the measured physical property to a remote computer system.

10. The system of claim 1, wherein the controller assembly is a programmable logic controller.

11. A method for controlling fluid flow through a flow line at a wellsite, the method comprising:

providing a control system comprising:
  a fluid supply;
  a first fluid line in fluid communication with the fluid supply;
  a pump in fluid communication with the first fluid line and configured to pump fluid from the fluid supply to one or more wellheads through the first fluid line;
  a second fluid line in fluid communication with the first fluid line at a location downstream of the pump and configured to return fluid from the first fluid line to the fluid supply;
  a safety valve in-line with the second fluid line and having a gate,
  a valve actuator configured to move the gate,
  a housing,
  an electronic controller assembly,
  a fluid drive assembly, and
  a valve assembly;
supplying fluid into the valve actuator using the fluid drive assembly to actuate the valve actuator to move the gate into a closed position;
maintaining the gate in the closed position to close fluid flow through the second fluid line;
monitoring a physical property in the first fluid line using the controller assembly; and
actuating the valve assembly using the controller assembly to release the fluid from the valve actuator so that a biasing member disposed in the valve actuator moves the gate into an open position, forces the fluid out of the valve actuator, and thereby opens fluid flow through the second fluid line based upon a comparison of the monitored physical property to a predetermined condition to return fluid from the first fluid line back to the fluid supply.

12. The method of claim 11, wherein the fluid supplied into the valve actuator by the fluid drive assembly is a pneumatic fluid disposed external to the housing, and further comprising filtering the pneumatic fluid as it enters the housing by the fluid drive assembly.

13. The method of claim 11, wherein the fluid supplied into the valve actuator by the fluid drive assembly is a hydraulic fluid disposed in a reservoir within the housing that is in fluid communication with the fluid drive assembly.

14. The method of claim 11, further comprising measuring the physical property using a transducer configured to communicate a signal corresponding to the measured physical property to the controller assembly.

15. The method of claim 11, wherein the fluid supplied into the valve actuator by the fluid drive assembly is a pneumatic fluid, and wherein the fluid drive assembly is a compressor.

16. The method of claim 11, wherein the fluid supplied into the valve actuator by the fluid drive assembly is a hydraulic fluid, and wherein the fluid drive assembly is a pump.

17. The method of claim 11, further comprising communicating a signal from the controller assembly to a remote computer system, wherein the signal corresponds to an operational characteristic of the safety valve.

18. The method of claim 11, further comprising actuating the safety valve by communicating a signal from a remote computer system to the controller assembly.

* * * * *